(12) United States Patent
Manabe

(10) Patent No.: US 6,404,552 B1
(45) Date of Patent: Jun. 11, 2002

(54) PROJECTION TYPE DISPLAY DEVICE

(75) Inventor: Yuji Manabe, Kamakura (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/450,565

(22) Filed: Nov. 30, 1999

(30) Foreign Application Priority Data

Nov. 30, 1998 (JP) .......................................... 10-339759
Nov. 29, 1999 (JP) .......................................... 11-338658

(51) Int. Cl.[7] ............................................. G02B 27/28
(52) U.S. Cl. ...................... 359/487; 359/292; 359/301; 359/586; 359/587; 359/589; 359/629; 359/634; 359/638; 359/640; 359/833; 359/834; 359/835; 359/836; 359/837
(58) Field of Search ................................ 359/487, 634, 359/586, 587, 589, 629, 638, 640, 833–837, 292, 301; 204/192.26–192.29, 471; 65/430; 349/5, 9, 57, 105

(56) References Cited

U.S. PATENT DOCUMENTS 5,861,984 A * 1/1999 Schöppe ..................... 359/385
5,914,817 A * 6/1999 Browning et al. .......... 359/634

* cited by examiner

Primary Examiner—Audrey Chang
Assistant Examiner—Craig Curtis
(74) Attorney, Agent, or Firm—Miles & Stockbridge P.C.

(57) ABSTRACT

A projection type display device constructed so that light source beams via a polarization beam splitter are separated of colors by a color separating/synthesizing optical system and enter light valves disposed for every color light, the light beams exiting from the respective light valves are synthesized by the color separating/synthesizing optical system, the synthesized light beams exit, the polarization beam splitter analyzes the synthesized light beams and takes out the analyzed light beams, and the analyzed light beams are projected on a screen through a projection lens. A normal line of an outgoing surface of the polarization beam splitter with respect to the light source beams exiting toward the color separating/synthesizing optical system from the polarization beam splitter, has a predetermined angle larger than zero degree with respect to an optical axis of the light source beams. An incident surface of the color separating/synthesizing optical system with respect to the light source beams exiting toward the color separating/synthesizing optical system from the polarization beam splitter, is disposed in parallel to the outgoing surface of the polarization beam splitter.

13 Claims, 18 Drawing Sheets

PROJECTION TYPE DISPLAY DEVICE

This application claims the benefit of Japanese Application No.10-339759 which is hereby incorporated by reference.

BACKGROUND OF THE INVENTION

1. Field of the Invention

The present invention relates generally to a full-color projection type display device having such a construction that reflection type light valves for R-, G- and B-light beams are disposed, beams of polarized light in individual colors which enter the respective light bulbs are modulated and exit, the modulated beams of light assuming the respective colors from the light valves are synthesized of colors, an analyzing optical system analyzes and takes out the synthesized beams of light, and the analyzed beams of light are projected through a projection lens, and more particularly to a projection type display device capable of reducing a projection of a ghost image.

2. Related Background Art

What is known as a prior art projection type display device is a full-color projection type display device disclosed in, e.g., Japanese Patent Application Publication No.2505758.

FIG. 18 shows the projection type display device disclosed in FIG. 1 of the above Patent Application Publication, and this display device will hereinafter be briefly explained.

Light beams emitted from a light source 23 travel through a shaping lens 22, then are converted into. substantially collimated beams of light and enter a polarization beam splitter 21. The light source beams entering the polarization beam splitter 21 are separated in polarization into beams of S-polarized light reflected by a polarization separator of the polarization beam splitter, and beams of P-polarized light penetrating through this polarization separator. The former beams of S-polarized light exit from the polarization beam splitter 21 and enter a color separating/synthesizing composite prism constructed of prisms 11A, 11B, 11C. Note that in this color separating/synthesizing composite prism, a surface 11e of the prism 11A is formed with a B-light reflection dichroic film, and a bonded surface between the prisms 11B and 11C is formed with an R-light reflection dichroic film. Further, an air gap is formed between the prisms 11A and 11B.

The light beams entering the prism 11A from the surface 11a travel through the prism, then impinge upon the B-light reflection dichroic film formed on the surface 11e, and are separated of colors into beams of B-light reflected therefrom and mixed beams of R- and G-light penetrating through the B-light reflection dichroic film, entering the prism 11B and traveling therethrough. The beams of B-light reflected by this film travel through the prism 11A, then are totally reflected by the surface 11a, further travel and exit from an outgoing surface 11b. Subsequently, the beams of B-light enter a B-light oriented reflection light valve 12 disposed in the vicinity of the outgoing surface. On the other hand, the mixed beams of R- and G-light having penetrated therethrough are incident upon the R-light reflection dichroic film. The beams of R-light reflected from this film travel through the prism 11B, then are totally reflected by an incident surface of the prism 11B, subsequently exit from an outgoing surface 11C and enter the R-light oriented light valve 13. The beams of G-light having traveled through the prism 11C travel further as they are, then exit from a surface 11d, and enter the G-light oriented light valve 14.

The beams of S-polarized light entering the respective color light oriented light valves receive modulating action by color signals and are thereby converted into beams of P-polarized light. Then, the light beams are reflected and exit as mixed beams of light of the thus modulated P-polarized light defined as the modulated light and the S-polarized light defined as the non-modulated light. The mixed beams of light exiting from the respective color light oriented light valves travel back along the above light paths, and exit as the color-synthesized beams of light from the surface 11a of the prism 11A. The color-synthesized beams of light are again made incident upon the polarization beam splitter 21, whereby only the P-polarized light as the modulated light is analyzed and taken out as the light of transmission through the polarization beam splitter. The color-synthesized light beams which have been analyzed enter the projection lens 24, thereby forming a desired full-color projected image on a screen 25.

In the projection type display device described above, however, it has proven that there might be a case where a ghost image is formed on the screen.

What has hitherto been known as a method of preventing the ghost image from appearing in the projected image on the projection type display device using the reflection type light valves may be a method disclosed in Japanese Patent Application Laid-Open Publication No.5-93887. A quarter-wave phase plate is disposed on the light path between the polarization beam splitter and the projection lens, the light beams among the projected beams of light entering the projection lens, which are reflected from the surfaces of some lens elements constituting the projection lens and travel back, are again incident on the light valves and reflected therefrom, and the ghost image is formed when these reflected beams of light reenter the projection lens. The above method was contrived to prevent this ghost image from being thus formed. Namely, the light beams conceived as a cause of the ghost image pass through the quarter-wave phase plate twice, thereby changing oscillating directions of the polarization thereof. With this being utilized, the light beams of the cause are cast away by the polarization beam splitter before reentering the light valves.

The ghost image described above could not, however, be prevented by disposing the quarter-wave phase plate between the projection lens and the polarization beam splitter. That is, in the projection type display device described above, the reflected light beams from the surfaces of the constructive lens elements of the projection lens are not the cause of the ghost image.

As a result of having studied the ghost image that occurred on the projection type display device and pursued the cause thereof, the present inventor has discovered that factors which will hereinafter be mentioned may be principal causes for forming the ghost image.

(1) The light beams, entering the prism member 11A, of the beams of S-polarized light exiting from the S-polarized light outgoing surface of the polarization beam splitter 21 of the projection type display device disclosed in the example of the prior art, partially receive the reflecting action from the incident surface 11a of the prism member 11A, thus travel back, then enter the polarization beam splitter 21, penetrate through a polarization separator, then enter the projection lens, and are projected as the ghost image.

(2) The beams of S-polarized light separated in polarization by the polarization beam splitter 21 are partially reflected by the S-polarized light outgoing surface, thus travel back, then penetrate through the polarization separator, and are projected as the ghost image:

(3) The beams of P-polarized light entering the polarization beam splitter, separated in polarization by the polarization separator and penetrating therethrough, are partially reflected by the P-polarized light outgoing surface, thus travel back, reflected by the polarization separator etc., then travel further, fall upon the projection lens, and are projected as the ghost image.

As explained above, it has proven that the cause of the ghost image is not single, and the ghost image is formed due to a plurality of factors overlapped.

For eliminating those causes, to start with, it might be considered that the reflected light be reduced by forming anti-reflection films on both of the polarization outgoing surfaces of the polarization beam splitter.

Based on this method, however, though capable of reducing the reflected light to some extent, it is impossible to make the reflected light completely disappear. Further, the anti-reflection film is composed of a dielectric multi-layered film, however, with respect to the incident light in a state of linearly polarized light, the penetrating light through and the reflected light from the anti-reflection film are unable to keep their states of being linearly polarized. Therefore, the problem is that both of those beams of light penetrate therethrough or are reflected therefrom as so-called elliptically polarized light having an S (P)-polarized light component in the case of, e.g., an incidence of the P (S)-polarized light.

For example, the reflected light of the P polarization in the item (3) is also reflected as the elliptically polarized light containing the S-component, and hence the S-component among the light beams traveling back is reflected toward the projection lens and inevitably projected as a ghost image.

Furthermore, as to the ghost images relative to the causes explained in the items (1) and (2), it can be considered that the anti-reflection layer is formed on the incident surface of the prism 11A and further formed also on the S-polarized light outgoing surface of the polarization beam splitter. The perfect anti-reflection can not be, as explained above, attained. Besides, those anti-reflection films are used as polarization compensation films for dichroic films utilized for color separations of the light beams to the color light oriented light valves and for color synthesization of the light beams exiting from the light valves and hence there arises a problem of being unable to incorporate a high-performance reflection preventive function. That is, the items (1) and (2) have a more serious problem than in the item (3).

SUMMARY OF THE INVENTION

Accordingly, it is a primary object of the present invention, which was devised under such circumstances, to provide a projection type display device capable of preventing unintended reflected light from an outgoing surface, etc. of a polarization beam splitter from entering a projection lens and becoming a cause of a ghost image.

To accomplish the above object, according to a first aspect of the present invention devised to prevent the ghost image due to the above causes from being projected, a projection type display device comprises a color separating/synthesizing optical system for making color separations of light source beams via a polarization beam splitter, light valves disposed for color light, upon which the color-separated light beams are incident, the light beams exiting from the lightvalves being synthesized by the color separating/synthesizing optical system, and the synthesized light beams exiting, a polarization beam splitter for analyzing the synthesized light beams and taking out the analyzed light beams, and a projection lens for projecting the analyzed light beams on a screen. In this projection type display device, a normal line of an outgoing surface of the polarization beam splitter with respect to the light source beams exiting toward the color separating/synthesizing optical system from the polarization beam splitter, has a predetermined angle larger than zero degree with respect to an optical axis of the light source beams, and an incident surface of the color separating/synthesizing optical system with respect to the light source beams exiting toward the color separating/synthesizing optical system from the polarization beam splitter, is disposed in parallel to the outgoing surface of the polarization beam splitter.

In the projection type display device, the normal line of the outgoing surface of the polarization beam splitter has the predetermined angle larger than zero degree with respect to the optical axis of the light source beams. The incident surface of the color separating/synthesizing optical system is disposed in parallel to the outgoing surface of the polarization beam splitter. Therefore, optical paths of the unintended reflected beams of light from the outgoing surface of the polarization beam splitter and from the incident surface of the color separating/synthesizing optical system, can be set off modulated light entering the projection lens, whereby the ghost image can be prevented from being formed.

In the projection type display device according to the first aspect of the invention, the polarization beam splitter includes a plurality of optical prism members, and the following formula is satisfied:

$$\sin(2\theta) > 2 \cdot NA/n \cdot (1-NA^2)^{1/2}$$

where θ is the predetermined angle made by the normal line of the outgoing surface of the polarization beam splitter and by the optical axis of the light source beams, n is the refractive index of each of the optical prism members constituting the polarization beam splitter, and NA is the numerical aperture of the projection lens on the side of the light valve.

In the projection type display device according to the first aspect of the invention, the optical axis of the light source beams entering the polarization beam splitter has an incident angle of 45 degrees to a polarization separator of the polarization beam splitter. The polarization beam splitter includes two triangular prisms, wherein one triangular prism has three apex angles of which one is 45 degrees, another is an obtuse angle, and the remaining is an acute angle, and the other triangular prism has three apex angles of which one is 45 degrees. A surface interposed between the apex angle of 45 degrees and the acute angle of one triangular prism and a surface including the apex angle of 45 degrees of the other triangular prism, are bonded in a state where the apex angles of 45 degrees are matched with each other and a polarization separation film is interposed therebetween.

In the projection type display device according to the first aspect of the invention, the optical axis of the light source beams entering the polarization beam splitter has an incident angle α other than 45 degrees to a polarization separator of the polarization beam splitter. The polarization beam splitter includes two triangular prisms, wherein one triangular prism has three apex angles of which one is α degrees, another is (α+θ) degrees if the predetermined angle is set to θ, and the other triangular prism has three apex angles of which one is α degrees. A surface interposed between the apex angle α and the apex angle (α+θ) of one triangular prism and a surface including the apex angle α of the other triangular prism, are bonded in a state where the apex angles α are matched with each other and a polarization separation film is interposed therebetween.

According to a second aspect of the present invention, a projection type display device comprises a color separating/synthesizing optical system for making color separations of light source beams via a polarization beam splitter, light valves, disposed for color light, upon which the color-separated light beams are incident, the light beams exiting from the light valves being synthesized by the color separating/synthesizing optical system, and the synthesized light beams exiting, a polarization beam splitter for analyzing the synthesized light beams and taking out the analyzed light beams, and a projection lens for projecting the analyzed light beams on a screen. In this projection type display device, the light beams among the light source beams, which are reflected by an outgoing surface of the polarization beam splitter, exit from the polarization beam splitter via the polarization separator of the polarization beam splitter and enter the projection lens, do not pass through an aperture defined by an aperture stop of the projection lens.

According to a third aspect of the present invention, a projection type display device comprises a color separating/synthesizing optical system for making color separations of light source beams via a polarization beam splitter, light valves, disposed for color light, upon which the color-separated light beams are incident, the light beams exiting from the light valves being synthesized by the color separating/synthesizing optical system, and the synthesized light beams exiting, a polarization beam splitter for analyzing the synthesized light beams and taking out the analyzed light beams, and a projection lens for projecting the analyzed light beams on a screen. In this projection type display device, the light beams among the light source beams, which exit from the polarization beam splitter, then are reflected directly from an incident surface of the color separating/synthesizing optical system and enter the projection lens via the polarization beam splitter, do not pass through an aperture defined by an aperture stop of the projection lens.

In the projection type display device according to the second aspect of the invention, the following construction may be adopted, wherein the light beams among the light source beams, which exit from the polarization beam splitter, then are reflected directly from an incident surface of the color separating/synthesizing optical system and enter the projection lens via the polarization beam splitter, do not pass through an aperture defined by an aperture stop of the projection lens.

According to a fourth aspect of the present invention, a projection type display device comprises a color separating/synthesizing optical system for making color separations of light source beams via a polarization beam splitter, light valves, disposed for color light, upon which the color-separated light beams are incident, the light beams exiting from the light valves being synthesized by the color separating/synthesizing optical system, and the synthesized light beams exiting, a polarization beam splitter for analyzing the synthesized light beams and taking out the analyzed light beams, and a projection lens for projecting the analyzed light beams on a screen. In this projection type display device, the other beams of polarized light among the light source beams, which are separated in polarization by the polarization beam splitter, then are reflected by an outgoing surface of the polarization beam splitter, exit from the polarization beam splitter via a polarization separator of the polarization beam splitter and enter the projection lens, do not pass through an aperture defined by an aperture stop of the projection lens.

According to a fifth aspect of the present invention, a projection type display device comprises a color separating/synthesizing optical system for making color separations of light source beams via a polarization beam splitter, light valves, disposed for color light, upon which the color-separated light beams are incident, the light beams exiting from the light valves being synthesized by the color separating/synthesizing optical system, and the synthesized light beams exiting, a polarization beam splitter for analyzing the synthesized light beams and taking out the analyzed light beams, and a projection lens for projecting the analyzed light beams on a screen. In this projection type display device, a normal line of an outgoing surface of the polarization beam splitter with respect to the light source beams exiting toward the color separating/synthesizing optical system from the polarization beam splitter, has a predetermined angle larger than zero degree with respect to an optical axis of the light source beams.

DESCRIPTION OF THE PREFERRED EMBODIMENTS

First Embodiment

Figure 1:
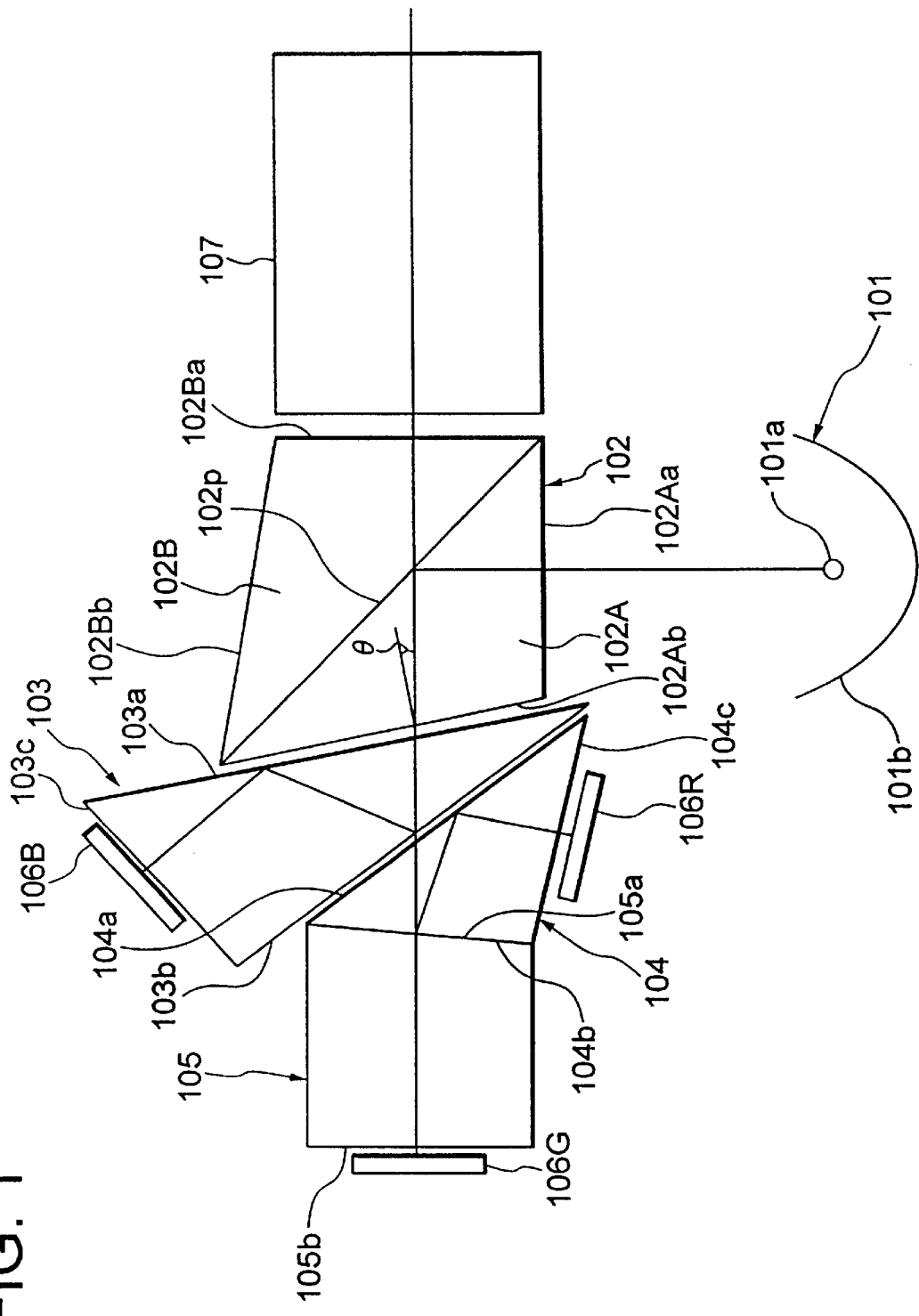
FIG. 1 is a view showing a construction of a projection type display device in a first embodiment of the present invention.

FIG. 1 shows a construction of a projection type display device in a first embodiment. This projection type display device includes a light source 101 constructed of a lamp 101a and a concave mirror 101b having a parabolic surface, a polarization beam splitter 102 including a polarization separating element 102b for separating beams of S-polarized light from beams of light emitted from the light source 101, a color separating/synthesizing optical system, composed of a plurality of triangular prism members 103, 104, 105, for making color-separations of the beams of S-polarized light into respective colors, reflection type light 106R, 106G, 106B for modulating the beams of S-polarized light assuming the respective colors which exit from the prism members 103, 104, 105, and a projection lens 107 for projecting, as a full-color image on a screen, modulated beams of light which are reflected by the reflection type light valves 106R, 106G, 106B and are color-synthesized with travel-back through the color separating/synthesizing optical system, after passing through the polarization beam splitter 102.

Figure 2:
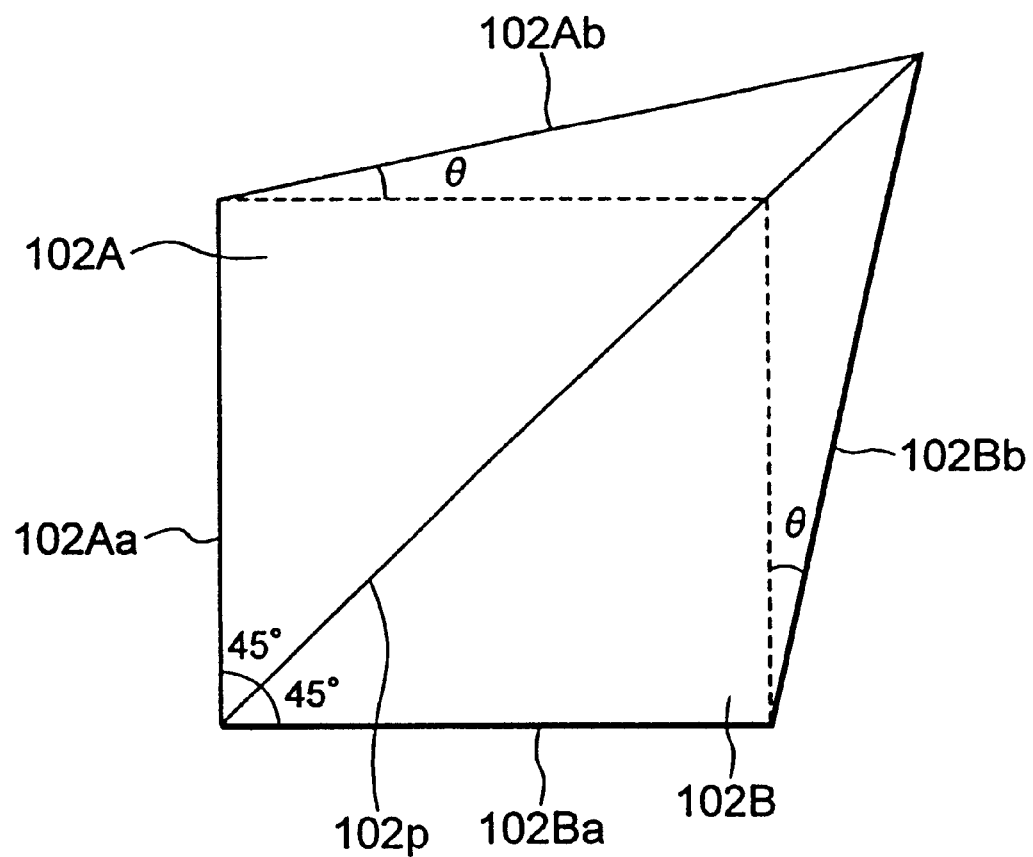
FIG. 2 is a view showing a configuration of a polarization beam splitter incorporated into the projection type display device in FIG. 1.

FIG. 2 is an explanatory view showing a structure of the polarization beam splitter 102 incorporated into the projection type display device shown in FIG. 1. The polarization beam splitter 102 used in the first embodiment functions as a polarization separating optical system and an analyzing optical system as well, and is constructed such that two angular prism members 102A, 102B each taking the same configuration are fixedly cemented via a polarization separator 102p. The prism members 102A, 102B used in the first embodiment are the same as those in the prior art in terms of both of them taking the same configuration, but are different from the prior art in terms of a sectional shape that is an obtuse-angled triangle to form a so-called obtuse-angled triangle prism. Note that four side surfaces 102Aa, 102Ab, 102Ba, 102Bb of the polarization beam splitter are each formed with an anti-reflection film. Further, an anti-reflection film is also formed on an incident surface 103a of the first prism member 103, and a B-beam reflection dichroic film is formed on a surface 103b. Moreover, an R-beam reflection dichroic film is formed between a surface 104b of the second prism member 104 and a surface 105a of the third prism member 105, and an anti-reflection film is formed between a surface 104c of the prism member 104 and a surface 105b of the prism member 105.

A specific sectional shape of each of the two prism members 102A, 102B constituting the polarization beam splitter 102, is that one apex angle is an obtuse angle (90°+θ) another apex angle is just 45°, and the last apex angle is an acute angle (45°−θ). Namely, an apex angle left by subtracting 90 degrees from the illustrated obtuse angle is defined as an angle θ. A polarization separation film serving as the polarization separator 102p is formed on a bottom surface facing to one obtuse angle of any one of those two prism members 102A, 102B. This bottom surface is bonded to a bottom surface of the other prism member so as to match 45-degree apex angles with each other, thus configuring the polarization beam splitter 102. Note that optical refractive indexes of the two prism members 102A, 102B are the same and each take a value "n".

Referring back to FIG. 1, the incident surface 103a of the first prism member 103 as a component of the color separating/synthesizing optical system is disposed in the vicinity of an S-polarized light outgoing surface 102Ab of the polarization beam splitter 102 as well as being parallel to the outgoing surface 102Ab.

An operation of the projection type display device shown in FIGS. 1 and 2 will hereinafter be described. Substantially collimated beams of light emitted from the light source 101 fall upon the incident surface 102Aa of the polarization beam splitter 102. The collimated beams of light are separated in polarization into beams of P-polarized light penetrating through the polarization separator 102p and cast away from the outgoing surface 102Bb, and beams of S-polarized light reflected by the polarization separator 102p, exiting from the outgoing surface 102Ab and thus used as illumination light.

The beams of S-polarized light reflected by the polarization separator 102p of the polarization beam splitter 102 and exiting from the outgoing surface 102Ab of the polarization beam splitter 102, strike the color separating/synthesizing optical system classified as a composite prism constructed of three prism members 103, 104, 105, and are separated of colors into beams of R-light, beams of G-light and beams of B-light.

To give a more specific explanation, the beams of light incident upon the anti-reflection film formed on the surface 103a of the prism member 103, travel directly via the anti-reflection film and enter the B-light reflection dichroic film formed on the surface 103b. These incident light beams are separated of colors into beams of B-light reflected by the B-light reflection dichroic film and mixed beams of light of the R-light and the G-light. The reflected beams of B-light travel through the prism member 103 and are again incident upon the surface 103a. The beams of B-light travel after being totally reflected therefrom, then exit as the B-light of the S-polarized light from the surface 103c formed with the anti-reflection film, and strike the B-light oriented reflection type light bulb 106B disposed in the vicinity of the outgoing surface 103c. The mixed beams of light of the R-light and the G-light, which exit from the surface 103b of the prism member 103, are incident on the surface 104a of the prism member 104 disposed facing via an air gap to the surface 103b. The mixed beams of light travelling as they are impinge upon the R-light reflection dichroic film formed on the bonded surface between prism member 104 and the prism member 105, i.e., one of the surfaces 104b and 105a, and are separated of colors into the R-light reflected by the R-light reflection dichroic film and the G-light penetrating through the R-light reflection dichroic film, incident upon the surface 105a and traveling through the prism member 105. The reflected beams of R-light travel through the prism member 104, impinge again upon the surface 104a, then are totally reflected therefrom and thus deflected. The reflected beams of R-light exit from the surface 104c formed with the anti-reflection film, and strike the R-light oriented reflection type light valve 106R disposed in the vicinity of the surface 104c. The beams of G-light incident on the prism member 105 directly travel and exit from the surface 105b formed with the anti-reflection film. Then, together with the converted beams of P-polarized light, the beams of G-light fall upon the G-light oriented reflection type light valve disposed in the vicinity of the surface 105b. in the respective light valves 106B, 106G, 106R, the beams of S-polarized light incident upon spots corresponding to pixels picked up by respective color image signals, are converted into the beams of P-polarized light, then reflected and exit therefrom. The beams of S-polarized light incident upon unselected spots are reflected intact as the S-polarized light without being changed, and exit as mixed beams of light of the P-polarized light and the S-polarized light from the light valves 106B, 106G, 106R.

The beams of light exiting from those light valves 106B, 106G, 106R travel back along the optical axis of incidence. Then, these beams of light are synthesized of colors by the composite prism constructed of the prism members 106R, 106G, 106B and exit as the synthesized beams of light from the surface 103a of the first prism member 103.

Those synthesized beams of light are again incident upon the outgoing surface 102A*b* of the polarization beam splitter 102, and the polarization separator 102*p* transmits only the target beams of P-polarized light corresponding to the modulated beams of light. The modulated beams of light transmitted exit from the surface 102B*a* of the polarization beam splitter 102 and fall upon a projection lens 107, whereby a full-color image is projected on a screen.

Figure 3:
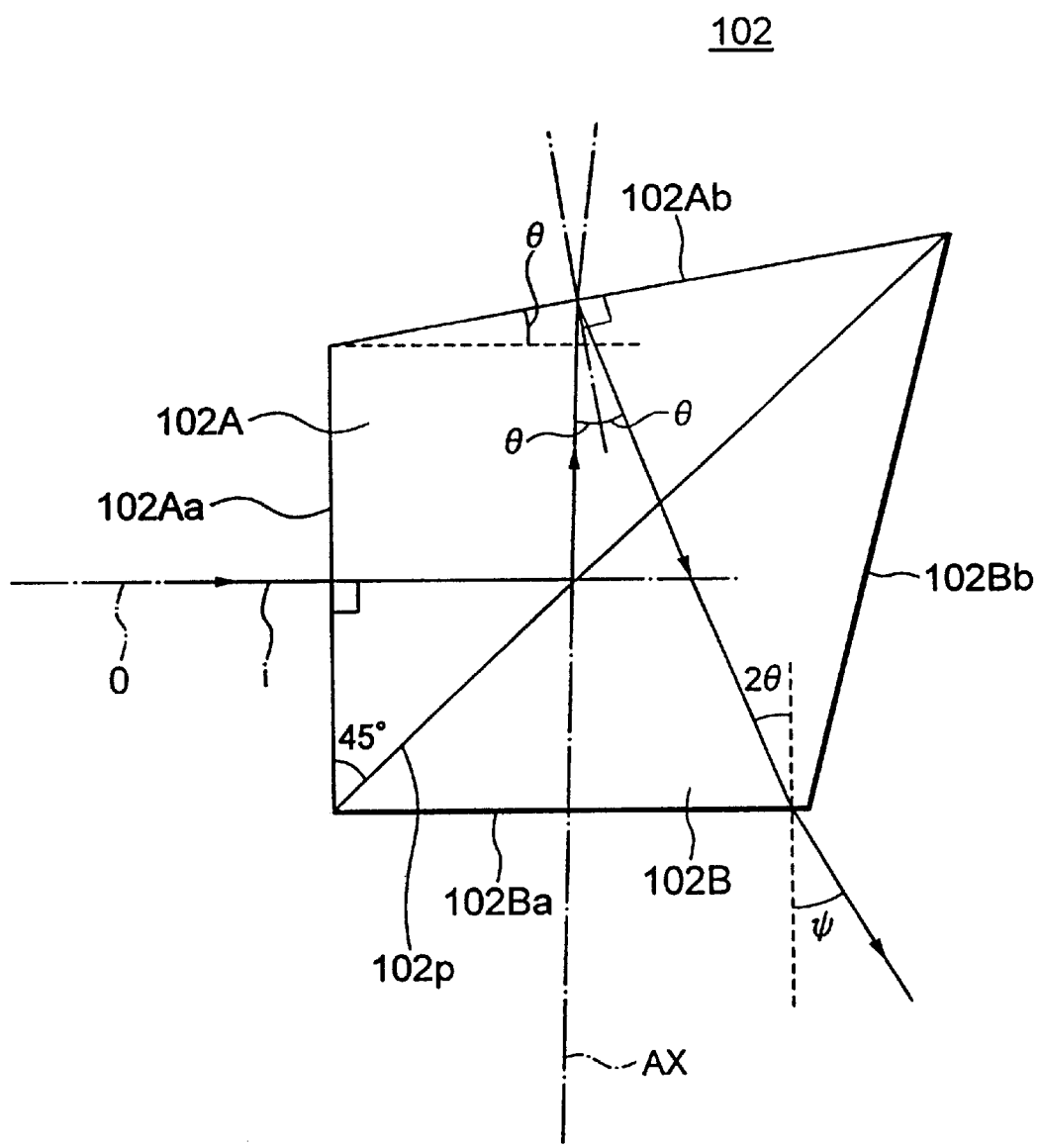
FIG. 3 is an explanatory view showing a light beam causing ghost light among the light beams entering the polarization beam splitter in FIG. 2.

FIG. 3 is an explanatory view specifically showing a light path of the light from the light source, etc. in the polarization beam splitter 102 shown in FIG. 2.

This polarization beam splitter 102 has the peculiar configuration described above, thereby making it feasible to eliminate a possibility in which the beams of light reflected from the outgoing surface 102A*b*, etc. are projected as a ghost image on the screen. This will be explained as follows.

Referring to FIG. 3, it is assumed that a beam of light i be incident upon the polarization beam splitter 102 along an optical axis O from the light source. In the polarization beam splitter 102, the incident surface 102A*a* is disposed perpendicularly to the optical axis O of the light of the light source, and the polarization separator 102*p* is disposed at 45° inclined to the optical axis O. The outgoing surface 102A*b* is not, however, perpendicular to the optical axis O and has an incidence angle θ larger than a zero degree with respect to the outgoing surface 102A*b* (an angle larger than the zero angle is made by the optical axis O and a direction of a normal line of the outgoing surface 102A*b*). That is, it follows that the light beams i among the beams of S-polarized light separated in polarization by the polarization separator 102*p* are incident on the outgoing surface 102A*b* not perpendicularly but at an angle θ. As a result, the light beams i are partially reflected at an angle 2θ by the outgoing surface 102A*b*, then incident at an incidence angle 2θ upon the outgoing surface 102B*a*, and exit at an angle ψ from this outgoing surface 102B*a*.

Note that the anti-reflection film, though formed on the outgoing surface 102A*b*, can not be formed as a high performance anti-reflection film in terms of a necessity for giving the film itself a function of a polarization compensation film so as to illuminate with the light valves 106B, 106R, 106G with linearly polarized light, and it follows that some of the light beams i reflected by the outgoing surface 102A*b* become slightly elliptically polarized light beams containing the P-polarized light component. Namely, the beams of S-polarized light reflected by the polarization separator 102*p* of the polarization beam splitter 102, as for the B-light component thereof, receive interactions of a plurality of dielectric films such as a transmission through the anti-reflection film on the outgoing surface 102A*b* of the polarization beam splitter, a transmission through the anti-reflection film on the incident surface 103*a* of the prism member 103, a reflection from the B-light reflection dichroic film on the surface 103*b*, a total reflection from the surface 103*a*, a transmission through the anti-reflection film on the surface 103*c* and so on, and the polarized state of the incident light changes depending on the respective films. In the respective actions of the reflection and the transmission, the polarized states relative to those dielectric films are designed so that the light beams, as a result, when striking the light valve 106B, become the linearly polarized light, and further so that the linearly polarized light is reflected by the light valve 106B, then travel back and thus impinge on the polarization separator 102*p* of the polarization beam splitter 102 as the linearly polarized light in a direction optimal to analyzing. Hence, there must be a limit to a scheme of obtaining a high transmittance of the anti-reflection film formed on the outgoing surface 102A*b* of the polarization beam splitter 102 by enhancing the performance thereof, and some beams travel back by their reflection. Further, as to the polarized states of the transmitted and reflected beams of light in the respective dielectric films, these beams are not linearly polarized but elliptically polarized.

Some contemplation is herein given to the angle ψ at which some of the light beams i exit from the outgoing surface 102B. the following formula (1) is established based on the Snell's law between the refractive index n, the angle θ, and the angle ψ of the prism members 102A, 102B.

$$\sin(\psi) = n \cdot \sin(2\theta) \tag{1}$$

Next, the projection lens 107 (see FIG.1) disposed in the vicinity of the outgoing surface 102B*a* will be considered.

Figure 4:
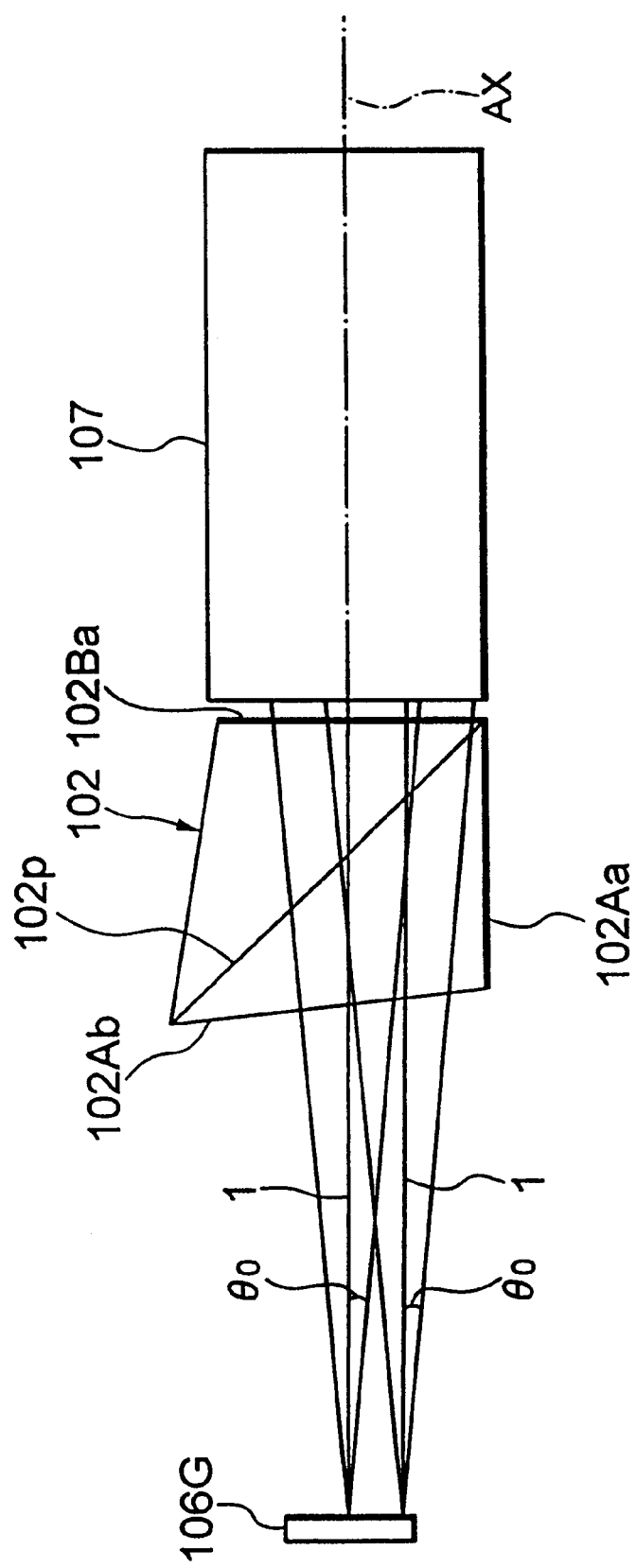
FIG. 4 is an explanatory view showing a projection lens and a numerical aperture (NA)

FIG. 4 is an explanatory view showing how the light falls upon the projection lens 107. The projection lens 107 has an aperture stop (not illustrated) within the lens, and has a predetermined numerical aperture NA determined by the aperture stop with respect to a front side (the side of the polarization beam splitter 102, in other words, the side of the lightvalves 106G) thereof. Namely, it. follows that only the light beams having a divergence angle from one point on the light valve 106G with respect to the numerical aperture NA, pass through the aperture stop and are projected on the screen.

The projection lens 107 is manufactured so that principal beams of light defined by the aperture stop exhibit a telecentric characteristic. To be specific, optical setting is that the light beams (the principal light beams) passing through the center of the aperture stop of the projection lens 107 are parallel with an optical axis AX when traveling through the polarization beam splitter 102, the light valve 106G, etc. More specifically, a layout of the lenses is that the position of the aperture stop of the projection lens 107 is coincident with a focal position of a front group lens disposed on the more anterior side than the aperture stop of the projection lens 107. A change in characteristic depending on the incidence angle of the light beams upon the polarization beam splitter 102, etc., can be minimized by giving the telecentric characteristic described above.

That is, it is assumed that all the light beams within the divergence angle θ0, to the centered principal light beams which travel in parallel with the optical axis AX from specified points on the light valve 106G and impinge. on the projection lens 107, are incident on the projection lens 107, travel through the aperture stop thereof and are projected on the screen. Based on this assumption, the numerical aperture NA of the projection lens 107 is defined by the following formula (2):

$$NA = \sin(\theta 0) \tag{2}$$

In other words, referring to FIG. 4, the light beams diverging beyond ±θ0 are intercepted by the aperture stop and therefore unable to penetrate through the projection lens 107.

The numerical aperture NA of the projection lens 107 is set in consideration of a characteristic of the modulated beams of light exiting from the light valve 106G. That is, supposing that the divergence angle of the light source beams (G-light beams in the beams of S-polarized light) illuminating the light valve 106G be on the order of θ0, an effective divergence angle of the modulated beams of light taken out of the light 106G is also approximately θ0. It therefore follows that the numerical aperture NA of the projection lens 107 is set to a value corresponding to the above divergence angle θ0.

Referring back to FIG. 3, contemplating the light beams i defined as the light source beams, the light beams i incident in parallel with the optical axis O are reflected by the outgoing surface 102A*b* of the polarization beam splitter 102 and exit as beams of ghost light from the outgoing surface 102B*a* toward the projection lens 107. On this occasion, an outgoing angle becomes ψ. That is, the beams of ghost light derived from the light beams i impinge upon the projection lens 107 at the angle ψ to the optical axis AX. Namely, the beams of ghost light due to the light beams i may be conceived as light beams exiting at the angle ψ to the optical axis AX.

Herein, if considering that the light source beams from the light source 101 are incident at a divergence angle on the order of ±θ0 upon the incident surface 102A*a* of the polarization beam splitter 102, the beams of ghost light exiting from the outgoing surface 102B*a* of the polarization beam splitter 102, become incident on the projection lens 107 as the light beams within an angular range of ±θ0 in which the light beams traveling having the angle ψ to the optical axis AX are centered.

Figure 5:
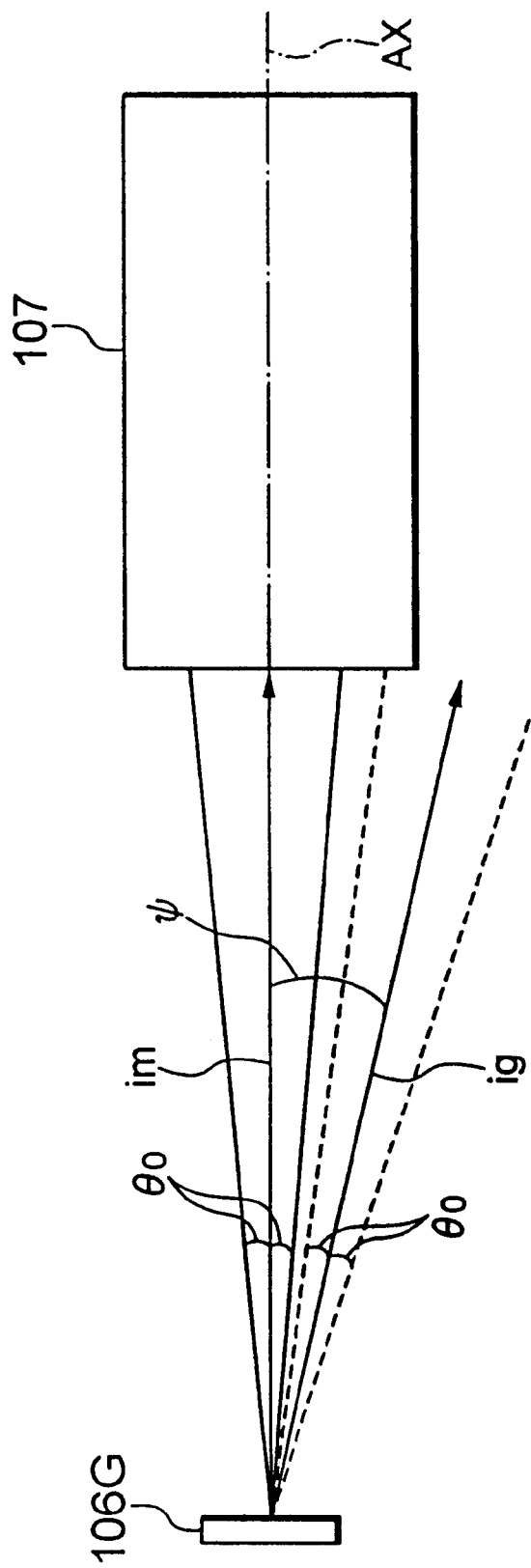
FIG. 5 is an explanatory view showing a direction in which the ghost light travels.

FIG. 5 is an explanatory view showing a light path of the ghost light described above. The light source beams coming from the light source 101 illuminate the light valve 106G and exit therefrom as the modulated beams of light. In this case, central light beams im parallel to the optical axis AX and corresponding to the light beams i penetrating through the outgoing surface 102A*b* and the light beams within the angle range of ±θ0 with the central beams im being centered, impinge on the projection lens 107, thereby forming a projection image. Further, the light source beams from the light source 101 are reflected by the outgoing surface 102A*b* of the polarization beam splitter 102 and exit as the beams of ghost light from the outgoing surface 102A*b*, in which case central light beams ig corresponding to the light beams i reflected by the outgoing surface 102A*b* and having an inclination ψ to the optical axis AX and the light beams thereof within the angle range of ±θ0 with the central beams ig being centered, exit toward the projection lens 107. It is, however, required that those beams of light be cut as the beams of ghost light.

As touched on in the discussion in FIG. 4, the projection lens 107 is so designed as to transmit and project only the light beams existing within the angular range of ±θ0 with respect to the principal light beams I parallel to the optical axis AX. Hence, the following is a condition for cutting, by the aperture stop in the projection lens 107, the beams of ghost light existing within the angular range of ±θ0 in which the central beams ig having the inclination ψ to the optical axis AX are centered. Namely, the inclined angle ψ of the central beams ig of the ghost light may be larger than 2θ0, and, if the following formula (3) is satisfied, the beams of ghost light can be prevented from being projected on the screen through the projection lens 107.

$$\psi > 2\theta_0 \quad (3)$$

When taking a sine in the formula (3), the result is:

$$\sin(\psi) > \sin(2\theta_0) \quad (4)$$

When transforming the right side of the formula (4) and further substituting the above formulae (1) and (2), the result is:

$$n \cdot \sin(2\theta) > 2 \cdot NA \cdot (1-NA^2)^{1/2} \quad (5)$$

Namely, the following formula (5) is established.

$$\sin(2\theta) > 2 \cdot NA/n \cdot (1-NA^2)^{1/2} \quad (5)$$

For meeting this condition, if setting the configuration and the optical refractive index of the polarization beam splitter 102 and setting the numerical aperture NA of the projection lens 107, it is feasible to prevent from being projected on the screen through the projection lens 107, the ghost image appearing when the beams of S-polarized light separated in polarization by the polarization beam splitter 102 are reflected by the outgoing surface 102A*b* of the polarization beam splitter 102 and travel back. The discussion on the G-light has been made so far, however, the same conditions are established with respect to the B-light and the R-light as well. if the polarization beam splitter 102 and the projection lens 107 are manufactured to satisfy the condition in the formula (5), the ghost images relative to the beams of B- and R-light can be prevented from being projected on the screen through the projection lens 107 Note that there has been explained so far the way of preventing the ghost image formed by the beams of light, reflected from the outgoing surface 102A*b*, of the S-polarized light reflected by the polarization separator 102*p* among the light source beams incident on the polarization beam splitter 102. The projection type display device in the first embodiment is, however, also effective in preventing the ghost image formed by other beams of reflected light. That is, it is possible to likewise prevent the ghost image formed by the beam of light, penetrating through the outgoing surface 102A*b* and reflected from the surface 103*a* of the prism member 103, of the S-polarized light reflected by the polarization separator 102*p*, and the ghost image formed by the beams of light, reflected from the outgoing surface 102A*b*, of the P-polarized light penetrating through the polarization separator 102*p*.

Figure 6:
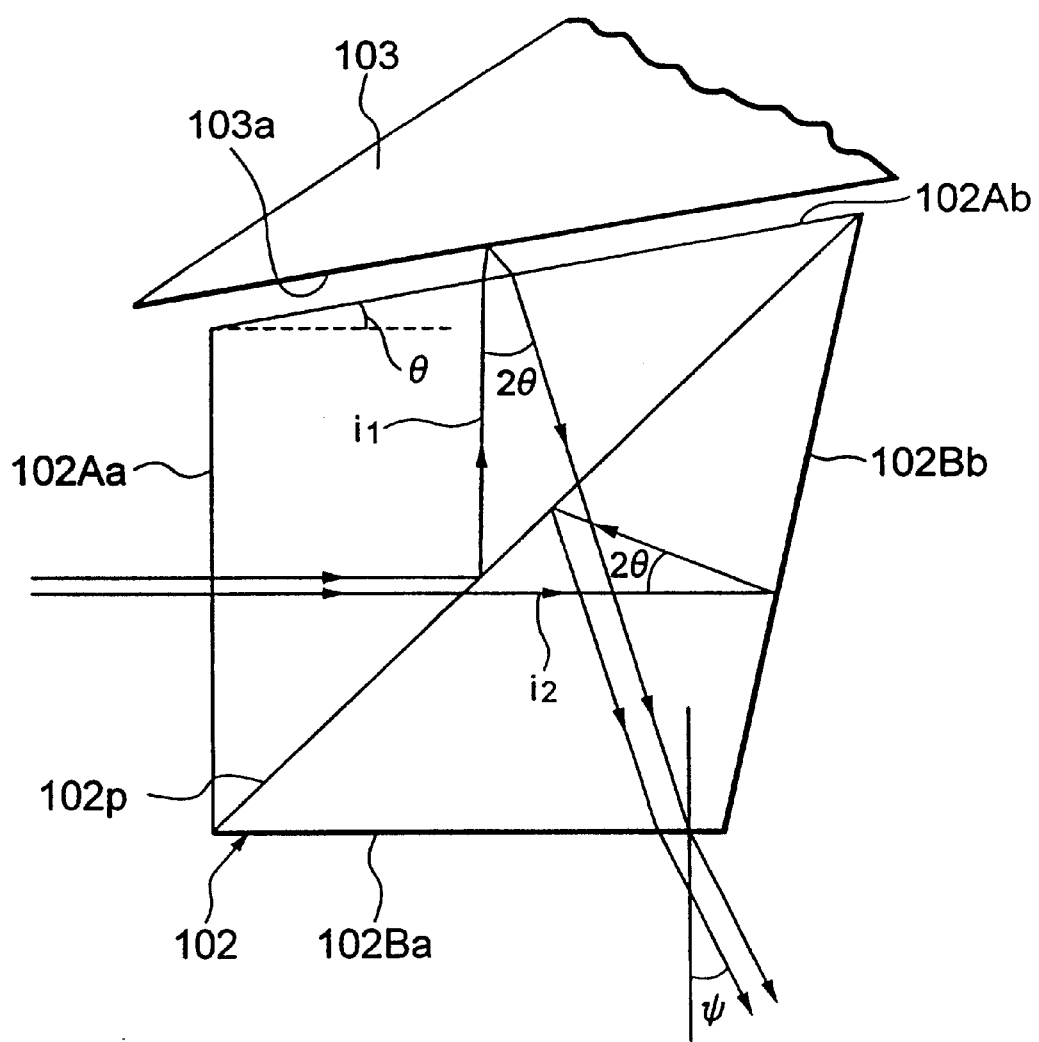
FIG. 6 is an explanatory view showing another beam of light causing the ghost light.

FIG. 6 is an explanatory view showing the reflected light from the surface 103*a* of the prism member 103, and the reflected light from the outgoing surface 102B*b* of the polarization beam splitter 102. It must be easy to comprehend that light beams i1, penetrating through the outgoing surface 102A*b*, reflected from the surface 103*a* of the prism member 103 and penetrating through the outgoing surfaces 102A*b*, 102B*a*, of the S-polarized light reflected from the polarization separator 102*p* of the polarization beam splitter, exit at the angle ψ from the outgoing surface 102B*a* of the polarization beam splitter 102 as in the case of FIG. 3 because of the configuration of the polarization beam splitter 102 and of the layout in which the incident surface 103*a* of the prism member 103 and the outgoing surface 102A*b* of the polarization beam splitter 102 are disposed in parallel with each other.

Incidentally, as already described, the anti-reflection film is formed on the surface 103*a* but can not be given the high performance in terms of the necessity for incorporating therein a function as the polarization compensation film so as to illuminate the light valves 106B, 106R, 106G with the linearly polarized light beams, and it follows that the light beams i reflected by the outgoing surface 103*a* become slightly elliptically polarized light beams and contain the P-polarized light component.

Further, light beams i2, reflected from the outgoing surface 102B*b*, further reflected by the polarization separator 102*p* and falling upon the outgoing surface 102B*a*, of the P-polarized light penetrating the polarization separator 102*p* of the polarization beam splitter 102, also exit at the angle ψ from the outgoing surface 102B*a* of the polarization beam splitter 102 as in the case of FIG. 3.

Namely, there exists no possibility in which the ghost images relative to both of the light beams i1 and i2 are projected through the projection lens 107 by meeting the above formula (5) on the occasion of manufacturing the polarization beam splitter 102, the projection lens 107, etc.

The discussion given above is based on the assumption that the projection lens 107 is so designed as to be telecentric in the forward direction (on the side of the light valve 106 G), i.e., the principal light beams I passing through the projection lens 107 are parallel to the optical axis AX in areas where the polarization beam splitter 102, the color separating/synthesizing optical systems 103, 104, 105 and the light valve 106G are disposed. If designed to be non-telecentric so that the principal beams of light of the projection lens 107 are not parallel to the optical axis AX, however, it is necessary to deal with a skew of the ghost light not to the light beams incident in parallel with the optical axis AX but to the principal beams of light having a predetermined inclination to the optical axis. To be specific, the angle ψ in FIG. 5 becomes larger by an inclined angle between the principal light and the optical axis AX, and, as a result, it is required that the angle θ be made much larger than in the case of the telecentric design in the formula (5).

Figure 15:
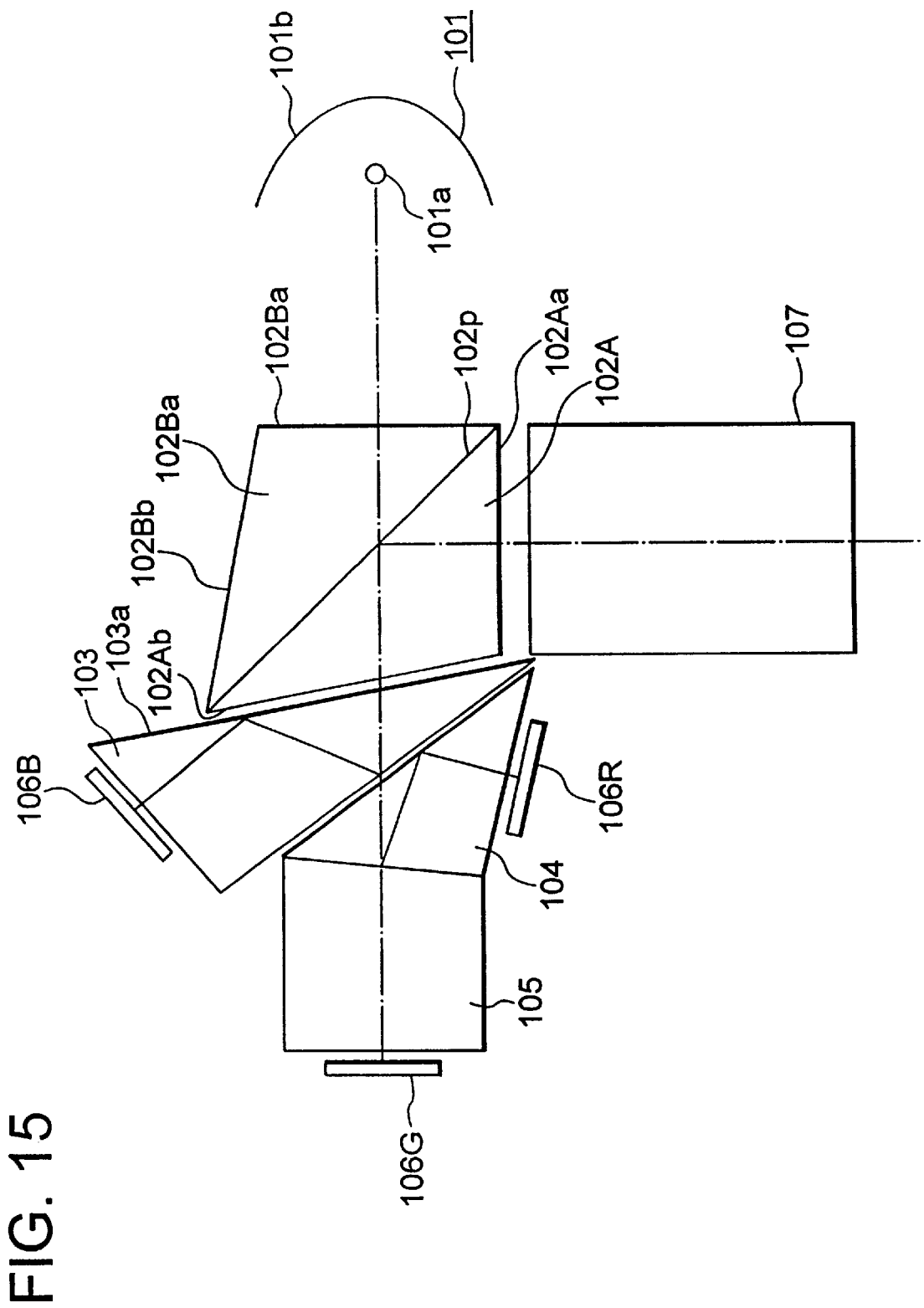
FIG. 15 is a view showing another construction of the projection type display device in the first embodiment.

The projection type display device described above is constructed such that the light source beams are separated in polarization by the polarization beam splitter 102, and the S-polarized light beams thereof which are reflected by the polarization separator 102p are incident upon the color separating/synthesizing optical system. Other construction may be taken, wherein the P-polarized light beams penetrating through the polarization beam splitter 102 are incident on the color separating/synthesizing optical systems 103, 104, 105. FIG. 15 is a view showing this construction of the projection type display device. In the projection type display device in FIG. 15, as compared with what is shown in FIG. 1, the light source 101 is exchanged in layout with the projection lens 107. More specifically, the light source 101 is disposed in a face-to-face relationship with the surface 102Ba of the polarization beam splitter 102, and the projection lens 107 is disposed facing to the surface 102Aa. Other constructive members are the same as those shown in FIG. 1. The projection type display device in FIG. 15 is also capable of, as in the case of the projection type display device in FIG. 1, eliminating the ghost image by utilizing the configuration, etc. of the polarization beam splitter 102.

That is, if constructed as described above, the modulated beams of light become the S-polarized light, and hence an optical layout may be such that the modulated beams of light exiting from the surface 102Aa of the polarization beam splitter 102 are projected on the screen through the projection lens 107. The light beams causing the ghost image which should be prevented from being projected are the light beams defined as the light source beams as well as being the beams of P-polarized light entering and penetrating through the polarization beam splitter 102, of which some beams are reflected from the outgoing surface 102Ab of the polarization beam splitter 102, some beams of the P-polarized light which are reflected by the surface 103a of the prism member 103 facing to the polarization beam splitter 102 after exiting from the beam splitter 102, and the light beams of the S-polarized light which are reflected by the outgoing surface 102Bb and travel back, the S-polarized light being reflected by the polarization separator 102p of the polarization beam splitter 102. In the thus constructed projection type display device also, if structured to meet the formula (5) given above, the ghost image caused by the above light beams is prevented from being projected.

In the projection type display device constructed so that the P-polarized light described above is used in the color separating/synthesizing optical system, as shown in FIG. 15, the modulated beams of light (analyzing light) to be projected become the beams of S-polarized light and are reflected from the polarization separator 102p of the polarization beam splitter 102. The polarization beam splitter 102 is constructed in such a way that a prism 102A and a prism 102B are bonded to each other with the polarization separator 102p being interposed therebetween. The dielectric multi-layered film constituting the polarization separator 102p is formed on an oblique surface of the prism 102A in FIG. 15 by a physical vapor deposition method such as a vacuum deposition. Then, the dielectric multi-layered film is fixed to the oblique surface of the prism 102B by a bonding agent. This configuration being thus taken, the projection modulated beams of light are reflected directly by the dielectric multi-layered film without via the bonding agent layer, travel through the prism 102A, then exit from the surface 102Aa, and impinge upon the projection lens 107.

Based on the configuration of projecting the P-polarized light as illustrated in FIG. 1, the P-polarized light to be projected penetrates through the polarization beam splitter 102. Therefore, the P-polarized light penetrates through the bonding agent layer of the polarization separator 102p, and hence it is preferable that the bonding agent layer be uniformly formed by bonding. If ununiform, there might be a case where the ununiformity of the bonding agent layer exerts its influence on the projected image.

Herein, a specific embodiment will briefly be discussed. The projection lens 107 is so designed as to be telecentric, and an F-value thereof is set to F/3.5. Supposing that the refractive index n of each of the two prism members 102A, 102B of the polarization beam splitter 102 is set to 1.8, the numerical aperture is defined such as NA=1/(2F), and this is substituted into the formula (5), thereby drawing θ>4.52 (degrees). That is, if the projection lens has a telecentric configuration, it follows that the polarization beam splitter 102 has an angle θ (e.g., 5°) over 4.52 degrees with respect to the plane where the outgoing surface 102Ab is orthogonal to the incident surface 102Aa.

Second Embodiment

Figure 7:
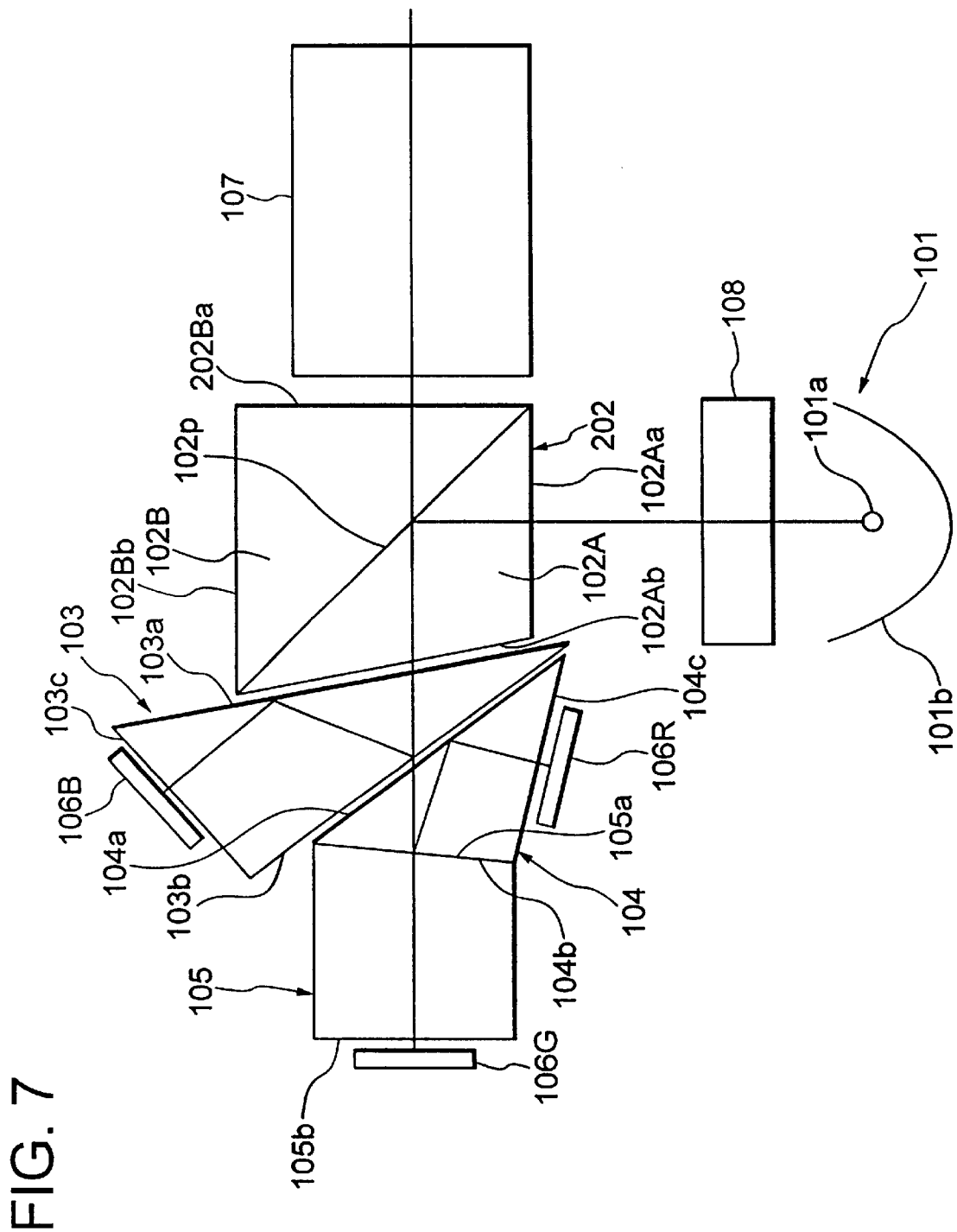
FIG. 7 is a view illustrating a construction of the projection type display device in a second embodiment.

FIG. 7 shows a structure of the projection type display device in a second embodiment. The display device in the second embodiment is a modified version of the projection type display device in the first embodiment. Referring to FIG. 7, the same members as those of the display device in the first embodiment are marked with the like numerals, of which the repetitive explanations are herein omitted. The display device in the second embodiment, as compared with the display device in the first embodiment, has some differences in which a polarization beam splitter 202 has a different configuration from the polarization beam splitter 102, and further a polarizing unit 108 for converting the light source beams into singly linearly polarized light beams is disposed between the light source 101 and the polarization beam splitter 202.

The substantially-collimated light source beams emitted from the light source 101 are incident upon the polarizing unit 108 and converted by this element 108 into the S-polarized light beams from random-polarized light beams. The polarizing unit 108 is constructed of a first lens plate including a plurality of lenses disposed in plane, a second lens plate of which lens elements are disposed corresponding to the respective lenses in focal positions of the lenses constituting the first lens plate, a polarization beam splitter array including a plurality of polarization beam splitters disposed in plane on an outgoing surface of the second lens plate, and a half-wave phase plate disposed on an outgoing surface of a predetermined polarization beam splitter disposed facing to a boundary area of the lenses constituting the second lens plate. In the polarizing unit 108, the beams of P-polarized light among the light source beams entering the polarization beam splitter disposed facing to the lenses constituting the second lens plate, penetrate through the polarization separator and travel straight. The remaining beams of S-polarized light thereof are reflected by this polarization separator, then enter the adjacent polarization beam splitter (disposed facing to the boundary area between the lenses configuring the second lens plate), subsequently are reflected therefrom, and exit in the same direction as that of the S-polarized light. Herein, the half-wave phase plate is disposed on the outgoing surface of the polarization beam splitter, from which the P-polarized light exits, and hence the P-polarized light concerned is converted into the S-polarized light and thus exits. Resultantly, the great majority of light source beams entering the polarizing unit 108 are converted into the beams of S-polarized light, and exit as illumination light from the polarizing unit 108.

The beams of S-polarized light defined as the illumination light, which exit from the polarization converting unit 108, fall upon the polarization beam splitter 202. The polarization beam splitter 202 is constructed of the obtuse-angled triangle prism member 102A as a component of the polarization beam splitter 102 in the first embodiment, and a prism member 202B taking a right-angled isosceles triangle, wherein a polarization separation film (which is the polarization separator 102p) formed on the bottom surface of one prism is fixedly bonded to the bottom surface of the other prism by the bonding agent. As a result of taking such a structure, an outgoing surface 202Bb, from which the P-polarized light penetrating through the polarization separator 102p exits, becomes perpendicular to the optical axis of the light source beams incident on the incident surface 102Aa and parallel to the incident surface 102Aa.

As discussed above, the illumination light is substantially converted by the polarization converting unit 108 into the S-polarized light before entering the polarization beam splitter 202, and therefore a large proportion of the light source beams striking the polarization separator 102p are reflected by the polarization separator 102p and then travel forward. By contrast, a quantity of the illumination light penetrating through the polarization separator 102p is very small. Namely, the light beams passing through the polarization separator 102p and arriving at the incident surface 202Bb are the light beams of transmission by dint of a transmitting characteristic of the polarization separation film constituting the polarization separator 102p, and the P-component which is not converted by the polarization converting unit 108. A quantity of these light beams is, however, by far smaller than in the case where a half of the light source beams penetrate through the polarization separator 102p as in the first embodiment. Accordingly, there might be a very small possibility in which the light beams passing through the polarization separator 102p impinge upon the projection lens 107, thereby making it feasible to effectively restrain the occurrence of the ghost light.

Further, the outgoing surface 202Bb may be formed with the anti-reflection film. With this anti-reflection film being provided thereon, a quantity of the light reflected from the outgoing surface 202Bb becomes almost ignorable, and there is no necessity for considering that the above reflected light might cause the ghost image.

As to the illumination light reflected by the polarization separator 102p, the beams of P-polarized light are converted by the polarization converting unit 108 into the beams of S-polarized light, and hence the light quantity thereof is large. Namely, a quantity of unintended reflected light from the outgoing surface 102Aa of the polarization beam splitter 202 and from the surface 103a of the prism 103 disposed in parallel to the surface 102Aa via an air gap, similarly increases corresponding to an increment in the quantity of the illumination light.

Both of the surfaces 102Ab, 103a are formed with the anti-reflection films, however, as described above, these two anti-reflection films can not be given the high performance in terms of the necessity for incorporating the functions as the polarization compensating films so as to illuminate the light valves 106B, 106R, 106G with the linearly polarized light beams. The anti-reflection film formed on the outgoing surface 202Bb does not require the function of the polarization compensating film, and therefore this is different from a scheme of attaining the high performance of the anti-reflection film in consideration of only the anti-reflection film.

Figure 8:
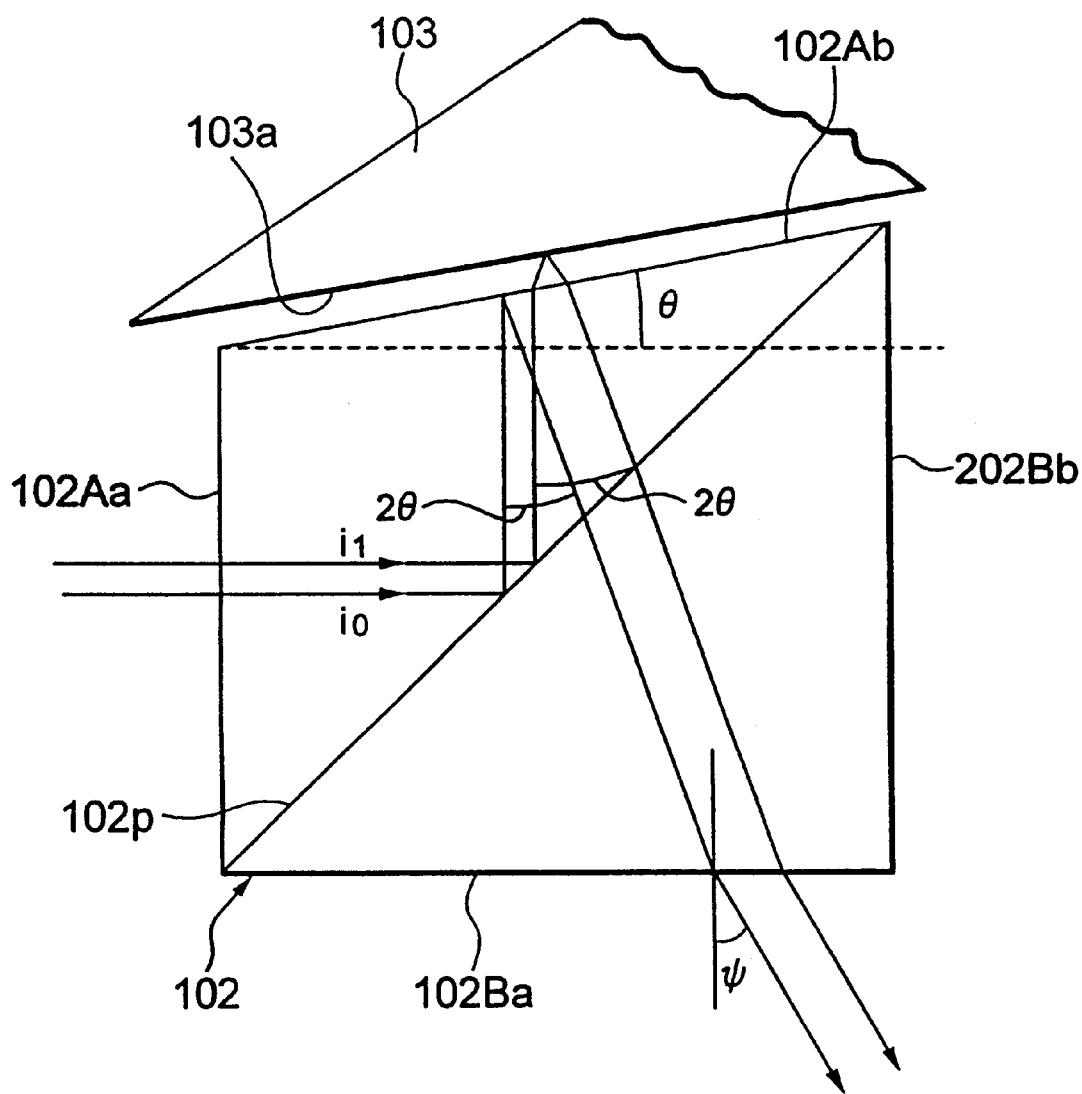
FIG. 8 is an explanatory view showing a light beam causing the ghost light.

FIG. 8 is an explanatory view showing light paths of the light beams reflected from the two surfaces 102Aa, 103a. As in the first embodiment, light beams i0, reflected by the outgoing surface 102Ab, of the beams of S-polarized light reflected by the polarization separator 102p of the polarization beam splitter 202, exit at the angle ψ from the outgoing surface 202Ba of the polarization beam splitter 202 owing to the configuration of the polarization beam splitter 202. Further, light beams i1, penetrating through the outgoing surface 102Ab, reflected by the outgoing surface 103a of the prism member 103 and passing through the outgoing surface 102Ab in the opposite direction, of the beams of S-polarized light reflected by the polarization separator 102p of the polarization beam splitter 202, exit at the angle ψ from the outgoing surface 202Ba of the polarization beam splitter 202 owing to the configuration of the polarization beam splitter 202.

The ghost images caused based on these two fluxes of the light beams i0, i1 can be, as touched upon in the discussion on the first embodiment, prevented by cutting unnecessary beams of light with the aperture stop of the projection lens 107 having the numerical aperture (NA).

Third Embodiment

Figure 9:
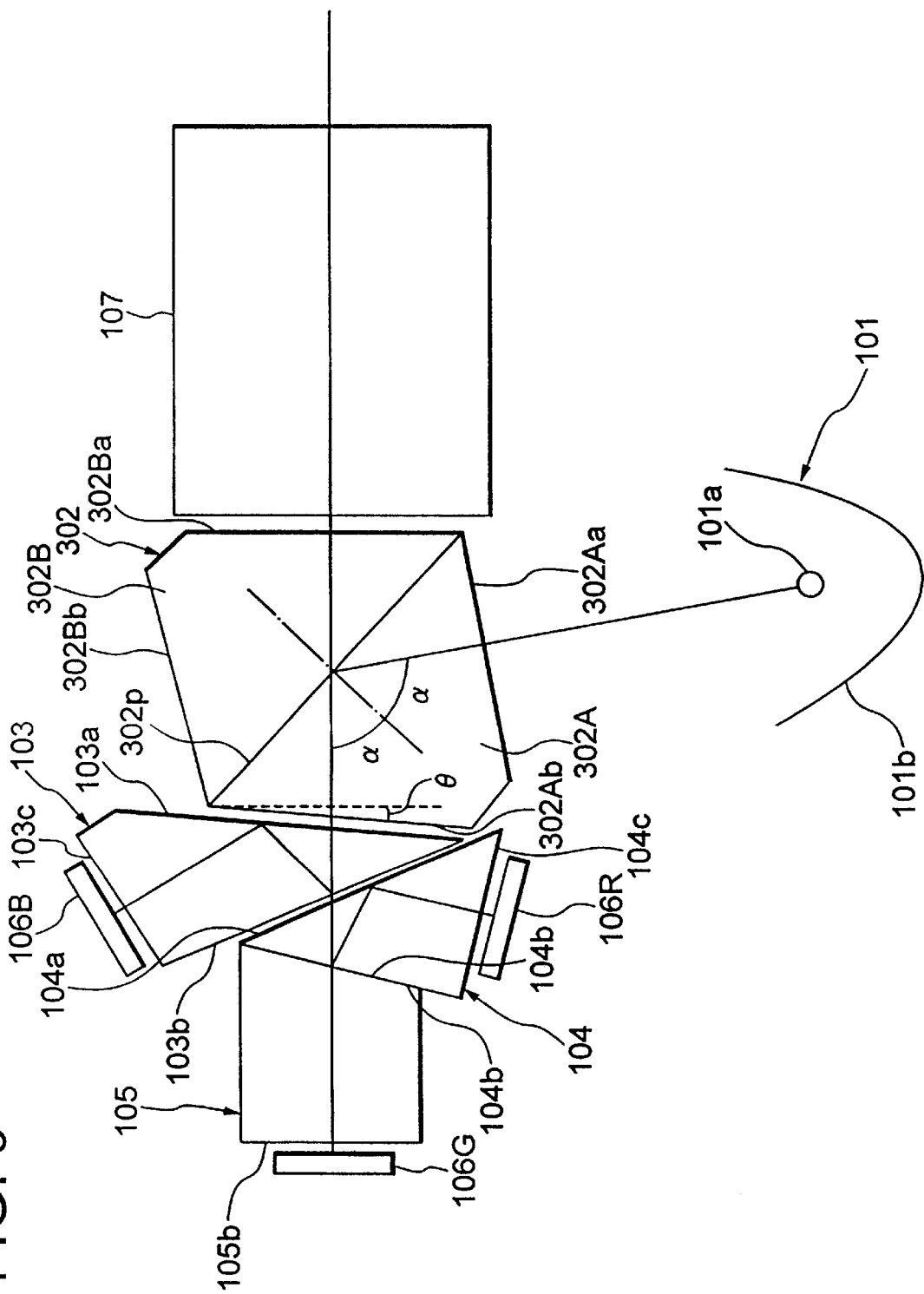
FIG. 9 is a view showing a construction of the projection type display device in a third embodiment of the present invention.

FIG. 9 illustrates a construction of the projection type display device in a third embodiment. The display device in the third embodiment is a modified version of the projection type display device in the first embodiment. Referring to FIG. 9, the same members as those of the display device in the first embodiment are marked with the like numerals, of which the repetitive explanations are herein omitted. The display device in the third embodiment, as compared with the display device in the first embodiment, has some differences in which a polarization beam splitter 302 has a different configuration from the polarization beam splitter 102, and, corresponding to difference, the disposition of the light source 101 is changed.

The substantially-collimated light source beams emitted from the light source 101 vertically enter the polarization beam splitter 302 from an incident surface 302Aa, and enter the polarization separator 302p at an angle α that is not 45 degrees. The light source beams incident upon the polarization separator 302p are separated in polarization into the beams of P-polarized light penetrating through the polarization separator 302p and cast away from the outgoing surface 302Ba, and the beams of S-polarized light reflected by the polarization separator 302p and exiting from the outgoing surface 302A*b* having an angle that is not zero degree but θ degrees made by the normal line to the optical axis. Note that the beams of S-polarized light exiting from the outgoing surface 302A*b* are used as the illumination light.

Figure 10:
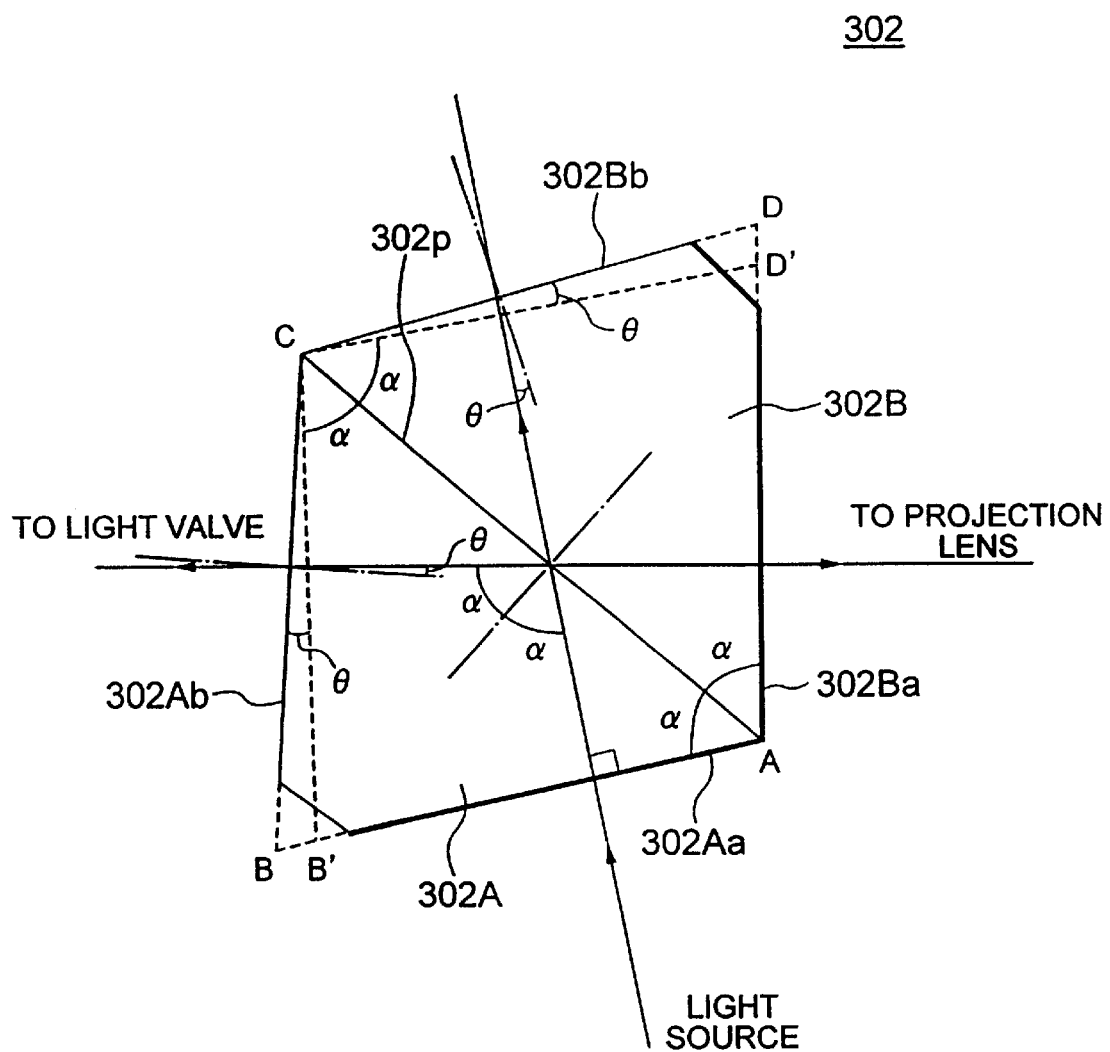
FIG. 10 is a view showing a configuration of the polarization beam splitter incorporated into the projection type display device in FIG. 9.

Herein, referring to FIG. 10, a structure of the polarization beam splitter 302 will be explained. The polarization beam splitter 302 used in the third embodiment is configured by bonding a pair of prism members 302A, 302B taking the same shape. It is assumed that n be a refractive index of an optical glass of which these two prism members 302A, 302B are composed. Sectional triangles (which are illustrated in the form of a triangle ABC and a triangle ADC, respectively) of the prism members 302A, 302B, take such a configuration that ∠BAC and ∠DAC are set to an angle α (for example 50° as shown in the figure), and ∠BCA and ∠ACD are set to an angle (α+θ). Note that apex angular portions containing the apexes B, D are cut away as shown in FIG. 10, however, this is done because of these apex angular portions being optically unnecessary. Herein, for an explanatory convenience, the explanation is given on the assumption that the apex angular portion of the triangular shape is not cut away.

When manufacturing the polarization beam splitter 302, as shown in FIG. 10, the two prism members 302A, 302B are bonded to each other at the same bottom surfaces interposed between one pair of apex angles α, α and α, α. One bottom surface thereof is, however, formed beforehand with the polarization separating film by the vacuum deposition, and the surface of the polarization separator 302*p* is bonded to another bottom surface by the bonding agent, thus integrating these prism members.

Namely, the sectional configuration of the polarization beam splitter takes a relationship of mirror symmetry based on the polarization separator 302*p*. A point B' and a point D' shown in FIG. 10 indicate respectively an intersection of a side AB with a line drawn from an apex C in parallel to a side AD, and an intersection of the side AD with a line drawn from an apex A in parallel to the side AB. A thus obtained square AB' CD' becomes a parallelogram, and there can be understood such a significance that the apex angles ∠BCA and ∠ACD have the angle (α+θ).

The illumination light from the light source 101 is vertically incident upon the incident surface 302A*a* of the polarization beam splitter 302, and therefore impinges on the polarization separator 302*p* at an incident angle α. The S-polarized light reflected at the angle α from the polarization separator 302*p* travels forward in accordance with the reflection law, and is incident at an incident angle θ upon the outgoing surface 302A*b* of the prism member 302A. A large proportion of the beams of S-polarized light, though some beams are reflected therefrom, penetrate through the prism member 302A. The beams of P-polarized light penetrating through the polarization separator 302*p* travel through the prism member 302B, and are incident at the incident angle θ upon the outgoing surface 302B*b*.

Referring back to FIG. 9, the beams of S-polarized light reflected by he polarization separator 302*p* of the polarization beam splitter 302 and exiting from the outgoing surface 302A*b*, enter the color separating/synthesizing optical system classified as a composite prism consisting of three triangular prism members 103, 104, 105, and are separated of colors into the R-light, the G-light and the B-light. Note that four side surfaces of the polarization beam splitter 302 are respectively formed with the anti-reflection films.

The respective color beams of light exiting from surfaces 103*c*, 104*c*, 105*b* of the prism members 103, 104, 105 are modulated in the lightvalves 106B, 106G, 106R, then reflected and exit therefrom. The color beams of light exiting from the light valves 106B, 106G, 106R travel back along the optical axis of incidence and are synthesized of colors by the prism members 105, 104, 103. Then, these color-synthesized beams of light exit from the surface 103*a* of the prism member.

The synthesized beams of light exiting from the surface 103*a* enter the polarization beam splitter 302 from the surface 302A*b* and impinge on the polarization separator 302*p*, wherein only the beams of P-polarized light defined as. the modulated beams of light penetrate through this polarization separator 302*p*. The modulated beams of light exiting from the outgoing surface 302B*b* fall on the projection lens 107 and are projected as a fill-color image on the screen.

Incidentally, as described in the first embodiment, thee is a given limit to the enhancement of the transmittance of each of the anti-reflection films formed on the outgoing surface 302A*a* of the polarization beam splitter 302 and on the surface 103*a* of the prism member 103, and some beams of the S-polarized light for illumination are converted into beams of elliptically polarized light at the outgoing surface 302A*a*, then reflected therefrom and travel back. Further, among the light sources, the beams of P-polarized light to be cast away, which have penetrated through the polarization separator 302*p* of the polarization beam splitter 302, are also partially reflected by the anti-reflection film formed on the outgoing surface 302B*b*, then become the beams of elliptically polarized light, and travel back.

In the projection type display device in the third embodiment, the polarization beam splitter 302 for polarization-separating the light source beams and serving as the analyzing optical system has the configuration illustrated in FIG. 2, and hence it never happens that the unintended reflected beams are projected as the ghost image. The following is an elucidation of why so.

Figure 11:
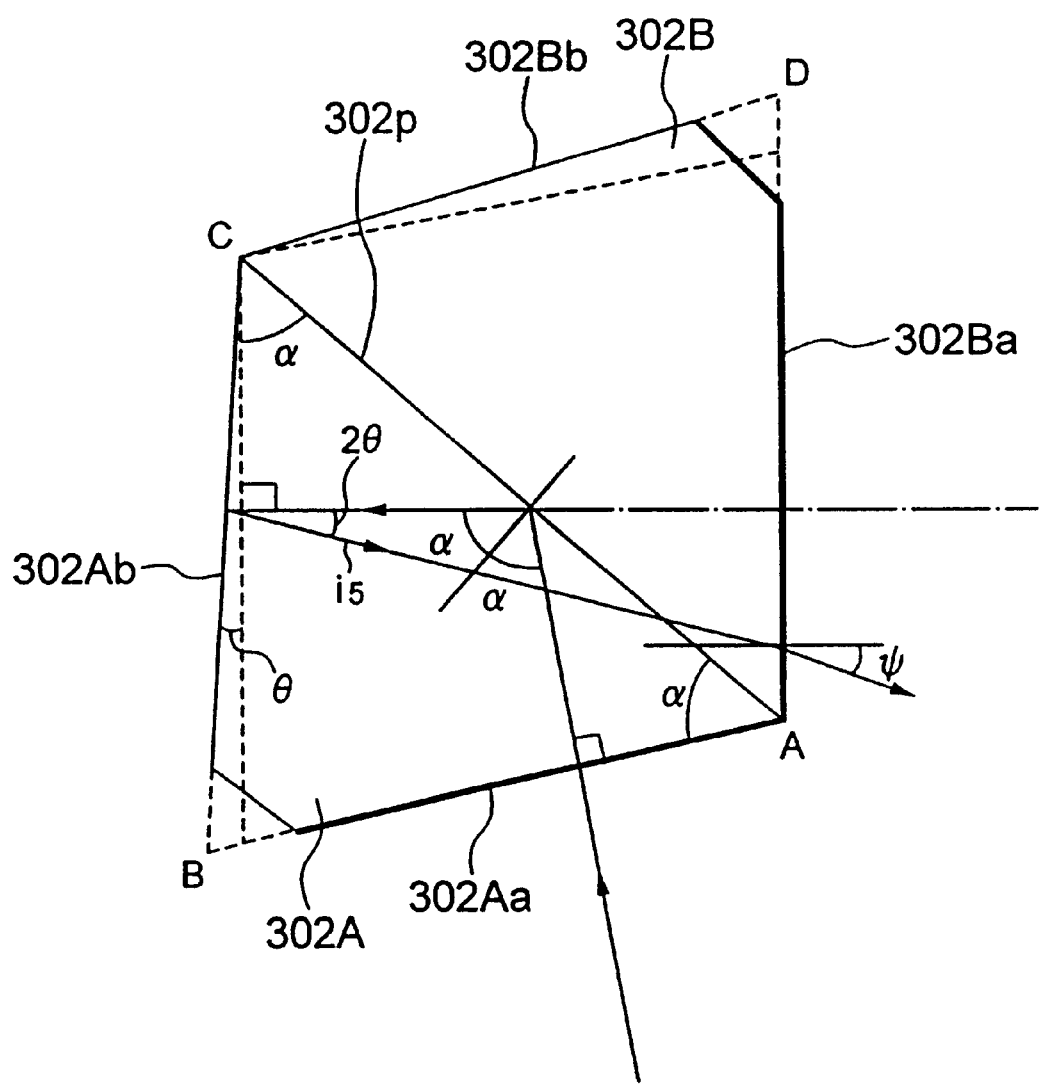
FIG. 11 is an explanatory view showing a light beam causing the ghost light among the light beams entering the polarization beam splitter in FIG. 10.

FIG. 11 shows light paths of the unintended reflected beams of light in the polarization beam splitter 302 shown in FIG. 10. What is herein contemplated is light beams i5 vertically entering the polarization beam splitter 302 via the surface 302A*a* thereof along the optical axis from the light source, reflected by the polarization separator 302*p*, passing through the prism 302A and reflected by the surface 302A*b*. The beams of S-polarized light, which vertically fall upon the incident surface 302A*a*, subsequently are incident at the incident angle θ on the polarization separator 302*p* and reflected therefrom, enter the surface 302A*b* at the incident angle θ, and are reflected at an angle 2θ to this light of incidence. Some of the unintended reflected beams of light penetrate through the polarization separator 302*p*, enter the prism member 302B, further fall at the incident angle 2θ upon the outgoing surface 302B*a* of the prism member 302B, and exit therefrom at the angle ψ into the air. This angle ψ satisfies the relationship defined by the formula (1) explained in the first embodiment.

Namely, if the numerical aperture NA of the projection lens 107 is set on the assumption that the projection lens 107 is telecentric in the forward direction so as to meet the condition in the formula (5) explained in the first embodiment in accordance with the refractive index and the configuration of the polarization beam splitter 302, the ghost light appearing when the beams of S-polarized light, separated in polarization by the polarization beam splitter 302, of the light source beams from the light source 101, are reflected by the outgoing surface 302A*b* and travel back, can be prevented from being projected on the screen through the projection lens 107.

Figure 12:
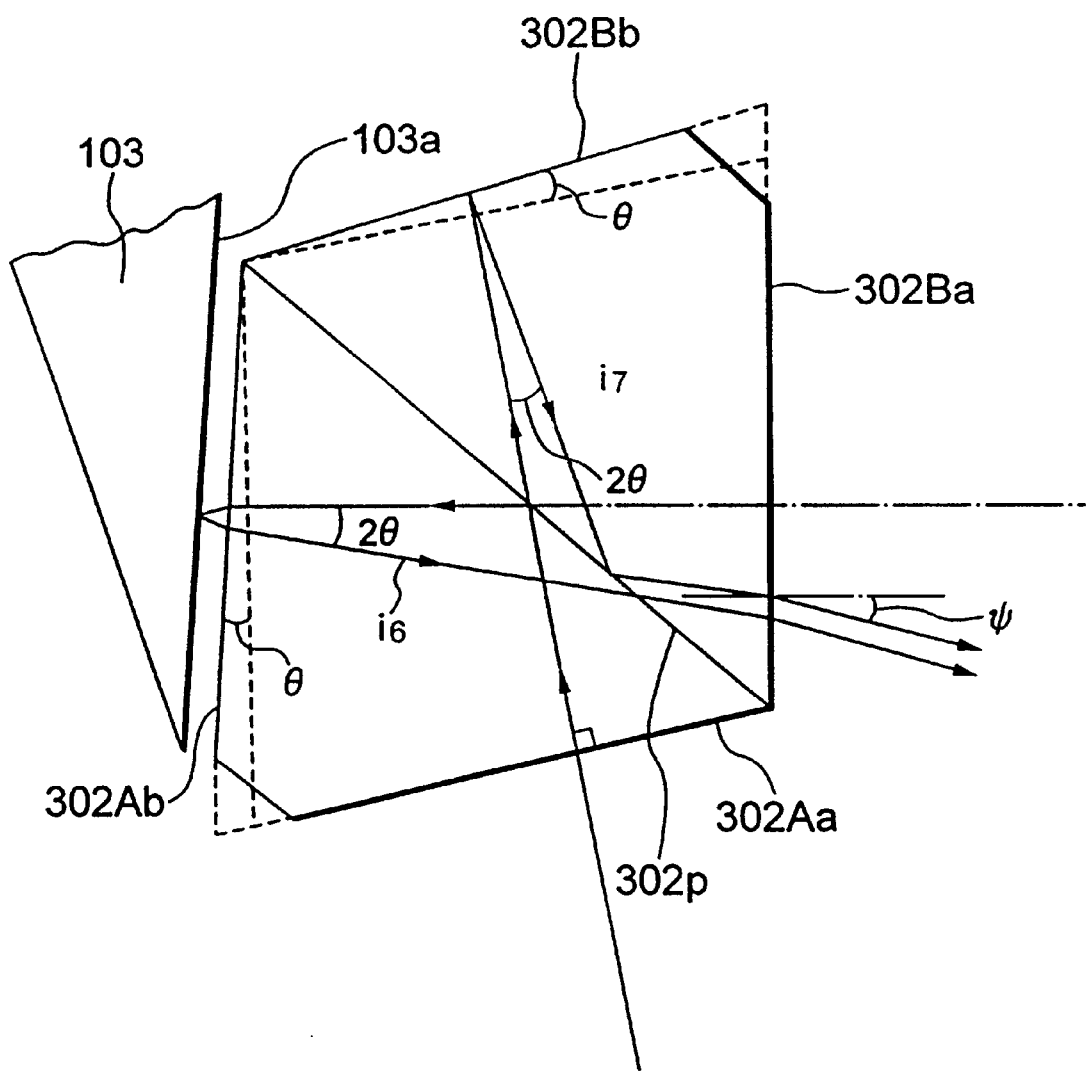
FIG. 12 is an explanatory view showing other beam of light causing the ghost light.

FIG. 12 is an explanatory view showing the unintended beams of light reflected by the surface 103$a$ of the prism member 103, and the unintended beams of light reflected by the outgoing surface 302B$b$ of the polarization beam splitter 302. Light beams i6, penetrating through the outgoing surface 302A$b$, reflected by the surface 103$a$ of the prism member 103 and penetrating through the outgoing surfaces 302A$b$, 302B$a$, of the beams of S-polarized light reflected by the polarization separator 302$p$ of the polarization beam splitter 302, as in the case of FIG. 11, exit at the angle $\psi$ from the outgoing surface 302B$a$ of the polarization beam splitter 302 because of the configuration of the polarization beam splitter 302 and of the arrangement in which the incident surface 103$a$ of the prism member 103 and the outgoing surface 302A$b$ of the polarization beam splitter 302 are disposed in parallel to each other. Further, light beams i7, reflected by the outgoing surface 302B$b$, further reflected by the polarization separator 302$p$ and entering the outgoing surface 302B$a$, of the beams of P-polarized light penetrating through the polarization separator 302$p$ of the polarization beam splitter 302, as in the case of FIG. 11, exit at the angle $\psi$ from the outgoing surface 302B$a$ of the polarization beam splitter 302. That is, when the formula (5) is satisfied when manufacturing the polarization beam splitter 302, the projection lens 107, etc., the ghost images relative to the two fluxes of light beams i6, i7 can be prevented from being projected through the projection lens 107.

In the discussion given above, the presumption is that the projection lens 107 is so designed as to be telecentric in the forward direction (toward the polarization beam splitter 302), however, if the principal beams of light have a fixed divergence angle with respect to the optical axis, the numerical aperture NA of the projection lens 107 is set corresponding to this divergence angle.

Moreover, the projection type display device is constructed so that the beams of S-polarized light, into which the light source beams are separated in polarization by the polarization beam splitter 302, are incident upon the color separating/synthesizing optical system but may also be constructed so that the beams of P-polarized light penetrating through the polarization beam splitter 302 are incident on the color separating/synthesizing optical system. In this case also, the occurrence of the ghost light can be avoided under the same condition.

On this occasion, the layout is that the light source 101 is exchanged with the light source in their layout in FIG. 7. To be more specific, the light source 101 is disposed facing to the surface 302B$a$ of the polarization beam splitter 302, and the beams of light from the light source 101 are incident upon the surface 302B$a$. The beams of P-polarized light, penetrating the polarization separator 102$p$, of the light beams incident upon the polarization separator 102$p$, exit from the surface 302A$b$ and enter the prism member 103 from the incident surface 103$a$. The light beams travel through the prism members 103, 104, 105 and are modulated in the light valves 106B, 106R, 106G, become the beams of S-polarized light and therefore, among the synthesized beams of light, exit from the surface 302A$a$ after being reflected by the polarization separator 302$p$ of the polarization beam splitter 302. Hence, the layout may be such that the projection lens 107 is disposed in the position facing to the surface 302A$a$.

The light beams relative to the ghost image that should be prevented from being projected are the light beams defined as the light source beams as well as being the beams of P-polarized light reflected from the outgoing surface 302A$b$ of the polarization beam splitter 302 after entering and penetrating through the polarization beam splitter 302, the beams of the P-polarized light which are reflected by the surface 103$a$ of the prism member 103 after exiting from the polarization beam splitter 302 and again entering the polarization beam splitter 302, and the light beams of the S-polarized light which should be cast away after being reflected by the polarization separator 302$p$ of the polarization beam splitter 302, further reflected from the outgoing surface 302B$a$ and thus travel back. This may be the same as the above-mentioned. If the polarization beam splitter 302 and others are configured to meet the formula (5), it is feasible to avoid the projection of the ghost image caused by the unintended reflected beams of light described above.

The projection type display device having the construction in which the beams of P-polarized light are used in the color separating/synthesizing optical system as described above, exhibits the same effects as those. touched upon in the discussion on the embodiment shown in FIG. 15. That is, in the case of the construction given above, the modulated beams of light (analyzing light beams) to be projected become the beams of S-polarized light, and this S-polarized light is reflected by the polarization separator 102$p$ of the polarization beam splitter 102. Accordingly, the projection modulated light is reflected directly by the dielectric multilayered film (the layers of which the polarization separator of the polarization beam splitter is composed) and enters the projection lens without via the bonding agent layer (the layer of the bonding agent for bonding two prisms constituting the polarization beam splitter). Hence, even if the bonding agent layer is ununiform, it follows that an influence thereof is not exerted on the projected image.

Fourth Embodiment

Figure 13:
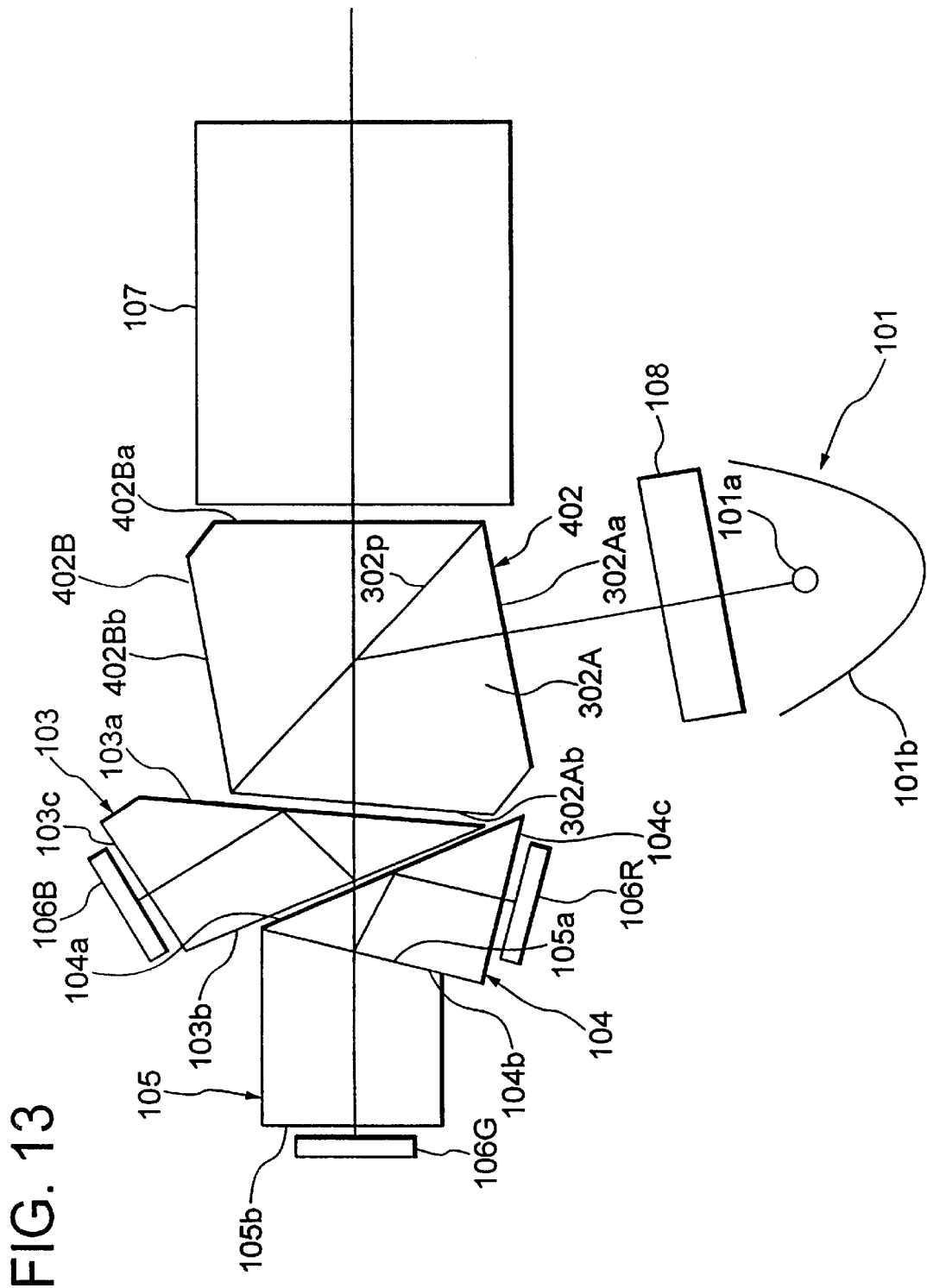
FIG. 13 is a view illustrating a construction of the projection type display device in a fourth embodiment.

FIG. 13 illustrates a structure of the projection type display device in a fourth embodiment. The display device in the fourth embodiment is a modified version of the projection type display device in the third embodiment. The display device in the fourth embodiment, as compared with the display device in the third embodiment, has some differences in which a polarization beam splitter 402 has a different configuration from the polarization beam splitter 302, and further a polarizing unit 108 for converting the light source beams into beams of singly linearly polarized light, is disposed between the light source 101 and the polarization beam splitter 402.

The substantially-collimated light source beams emitted from the light source 101 enter the polarizing unit 108, wherein the light beams are converted into the beams of S-polarized light from beams of random-polarized light. This polarizing unit 108 has the same structure as the polarizing unit in the second embodiment. A large proportion of the light source beams entering the polarizing unit 108 are converted into the beams of S-polarized light, and exit as the illumination light from the polarizing unit 108.

The beams of S-polarized light categorized as the illumination light which exit from the polarization converting unit 108, fall on the polarization beam splitter 402. The polarization beam splitter 402 is constructed of a prism member 302A as a component of the polarization beam splitter 302 in the third embodiment, and a prism member 402B taking the isosceles triangle of which two interior angles are each set to an angle $\alpha$. The polarization beam splitter 402 is configured by fixedly bonding the polarization separation film (the polarization separator 302$p$) formed on the bottom surface of one prism to the bottom surface of the other prism by the bonding agent. As a result of taking the structure described above, an outgoing surface 402B$b$ from which the beams of P-polarized light penetrating through the polarization separator 302$p$ exit, becomes perpendicular to the optical axis of the light source beams entering the incident surface 302A$a$ and parallel to the incident surface 302A$a$.

As discussed above, the beams of illumination light are substantially converted by the polarization converting unit 108 into the beams of S-polarized light before entering the polarization beam splitter 402, and hence a large proportion of the light source beams incident on the polarization separator 302$p$ are reflected by the polarization separator 302$p$ and thus travel, while a quantity of the light source beams penetrating through the polarization separator 302$p$ is very small. Namely, the light beams passing through the polarization separator 302$p$ and arriving at the incident surface 402B$b$, are the light beams of transmission by dint of a transmitting characteristic of the polarization separation film constituting the polarization separator 302$p$, and the P-component which is not converted by the polarization converting unit 108. A quantity of these light beams is, however, by far smaller than in the case where a half of the light source beams penetrate through the polarization separator 302$p$ as in the third embodiment. Accordingly, there might be a very small possibility in which the light beams passing through the polarization separator 302$p$ impinge upon the projection lens 107, thereby making it feasible to effectively prevent the occurrence of the ghost light.

Further, the outgoing surface 402B$b$ may be formed with the anti-reflection film. With this anti-reflection film being provided thereon, a quantity of the light reflected from the outgoing surface 402B$b$ becomes almost ignorable, and there is no necessity for considering the possibility that the above reflected light might cause the ghost image.

As to the illumination light reflected by the polarization separator 302$p$, the beams of P-polarized light are converted by the polarization converting unit 108 into the beams of S-polarized light, and hence the light quantity thereof is large.

Both of the surfaces 302A$b$, 103$a$ are formed with the anti-reflection films. However, these two anti-reflection films can not be given the high performance in terms of the necessity for incorporating the functions as the polarization compensating films so as to illuminate the light valves 106B, 106R, 106G with the linearly polarized light beams. The anti-reflection film formed on the outgoing surface 402B$b$ does not require the function of the polarization compensating film, and therefore this is different from a scheme of attaining the high performance of the anti-reflection film in consideration of only the anti-reflection film.

Figure 14:
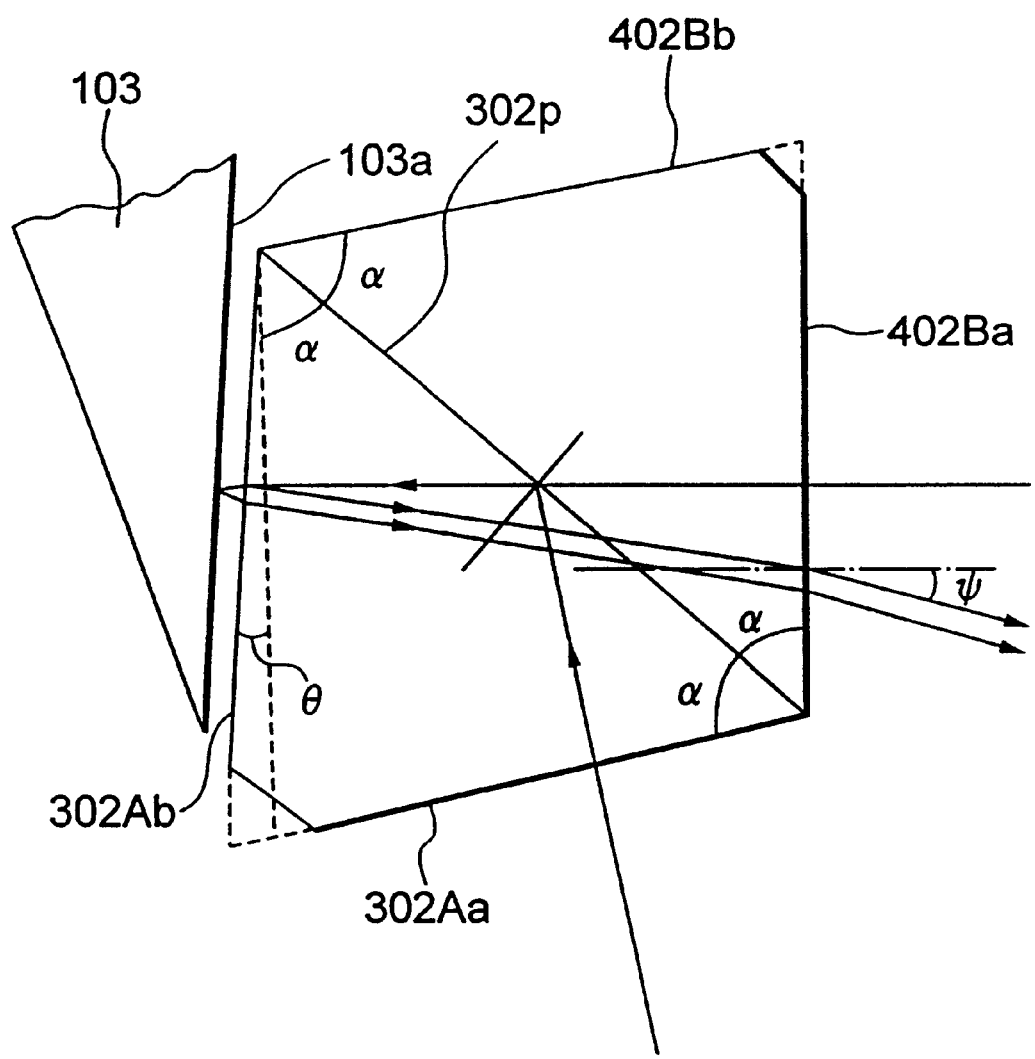
FIG. 14 is an explanatory view showing a light beam causing the ghost light.

FIG. 14 is an explanatory view showing light paths of the light beams reflected from the two surfaces 302A$a$, 103$a$. As in the third embodiment, the light beams, reflected by the outgoing surface 302A$b$, of the beams of S-polarized light reflected by the polarization separator 302$p$ of the polarization beam splitter 402, exit at the angle $\psi$ from the outgoing surface 402B$a$ of the polarization beam splitter 402 owing to the configuration of the polarization beam splitter 402. Further, the light beams, penetrating through the outgoing surface 302A$b$, reflected by the outgoing surface 103$a$ of the prism member 103 and passing through the outgoing surface 302A$b$ in the opposite direction, of the beams of S-polarized light reflected by the polarization separator 302$p$ of the polarization beam splitter 402, exit at the angle $\psi$ from the outgoing surface 402B$a$ of the polarization beam splitter 402 owing to the configuration, etc. of the polarization beam splitter 402.

The ghost images caused based on these two fluxes of the light beams can be, as touched upon in the discussion on the third embodiment, prevented by cutting unnecessary beams of light with the aperture stop of the projection lens 107 having a proper numerical aperture (NA).

Fifth Embodiment

Figure 16:
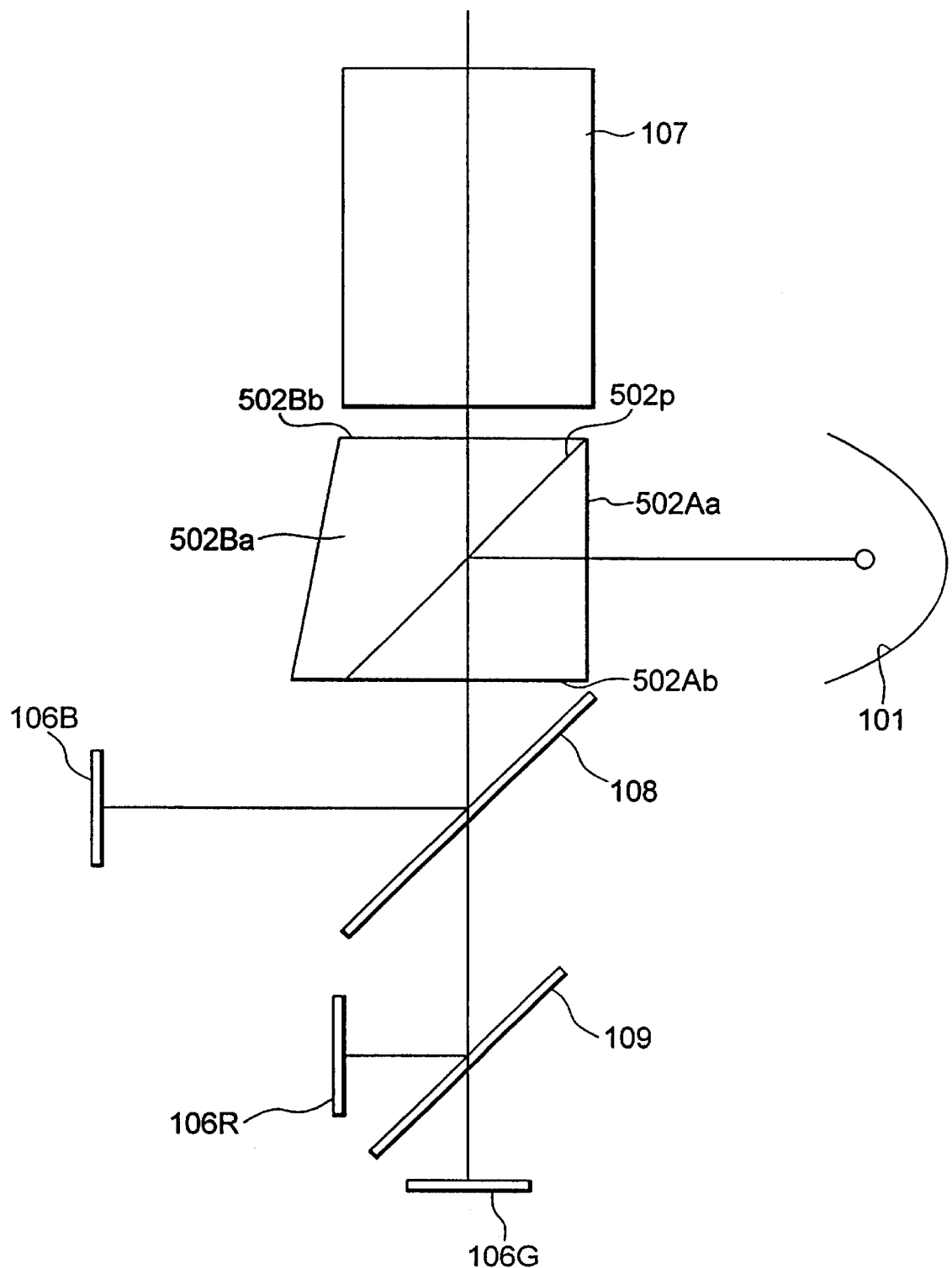
FIG. 16 is a view illustrating a construction of the projection type display device in a fifth embodiment.

FIG. 16 is a view showing a construction of the projection type display device in a fifth embodiment. The projection type display devices in the first to fourth embodiments involve the use of the dual-purpose composite prisms consisting of the prisms 103, 104, 105 serving as the optical system for making the color-separation of the S- or P-polarized light via the polarization beam splitter and for synthesizing the beams of light exiting from the respective light valves. In accordance with the fifth embodiment, the optical system incorporating the same function has such a configuration that a B-light reflection dichroic mirror 108 and an R-light reflection dichroic mirror 109 are disposed.

The light beams emitted from the light source 101 enter a polarization beam splitter 502 from a surface 502A$a$, and are separated in polarization into the beams of S-polarized light reflected by a polarization separator 502$p$ and beams of P-polarized light travelling directly. The beams of S-polarized light exit from a surface 502A$b$, and enter the B-light reflection dichroic mirror 108 disposed on the optical axis in parallel to the polarization separator 502. Then, these beams of light are separated of colors into beams of B-light reflected by the B-light reflection dichroic mirror 108 and entering the light valve 106B, and into mixed beams of the R- and G-light penetrating therethrough and then traveling. The mixed beams of R- and G-light further travel and enter the R-light reflection dichroic mirror 109 disposed on the optical axis in parallel with the dichroic mirror 108. Then, the mixed beams of R- and G-light are separated of colors into the R-light reflected by the R-light reflection dichroic mirror 109 and the G-light penetrating through the mirror 109, and these beams of R- and G-light are incident upon the light valves 106R and 106G.

The beams of light assuming the respective colors reflected by and exiting from the light bulbs 106B, 106R and 106G, travel back along the axis of incidence, thereby attaining the color synthesization with the dichroic mirrors 109, 108. The color-synthesized beams of light enter the polarization beam splitter 502 from the surface 502A$a$, and, by dint of the separation in polarization, the modulated beams of light are taken out as beams of light penetrating through the polarization separator 502$p$. The beams of light having penetrated therethrough exit from the surface 502B$b$. These beams of light enter the projection lens 107 and are projected on the screen.

Figure 17:
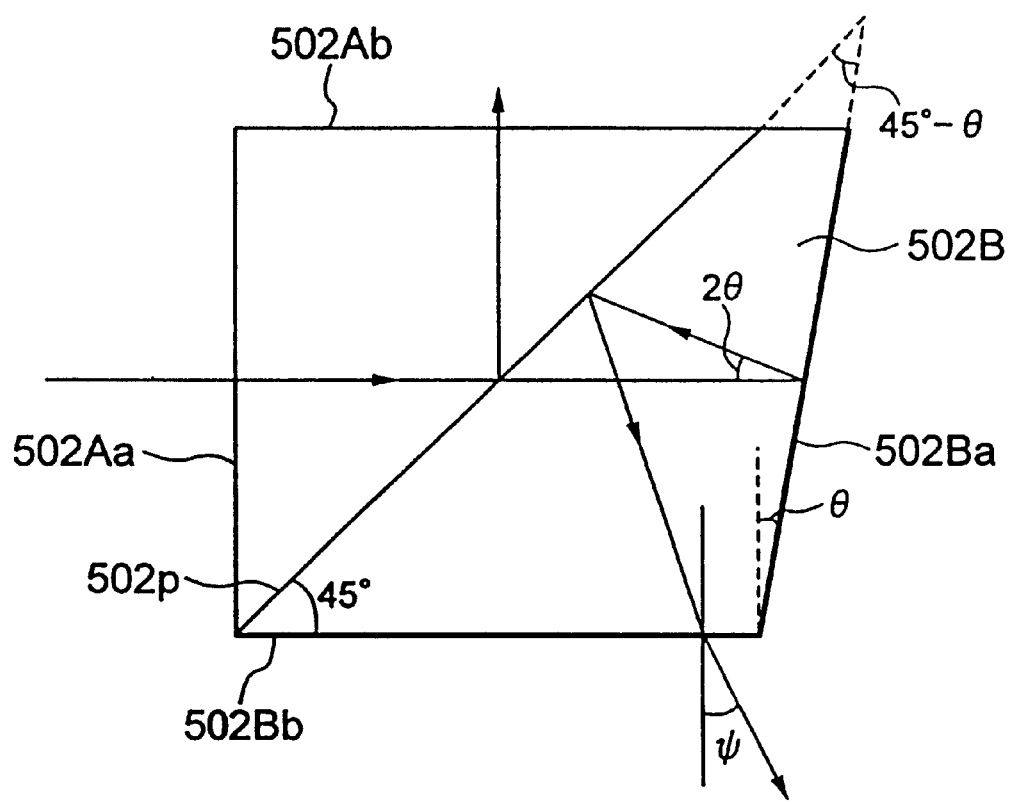
FIG. 17 is an explanatory view showing a light beam causing the ghost light.
Figure 18:
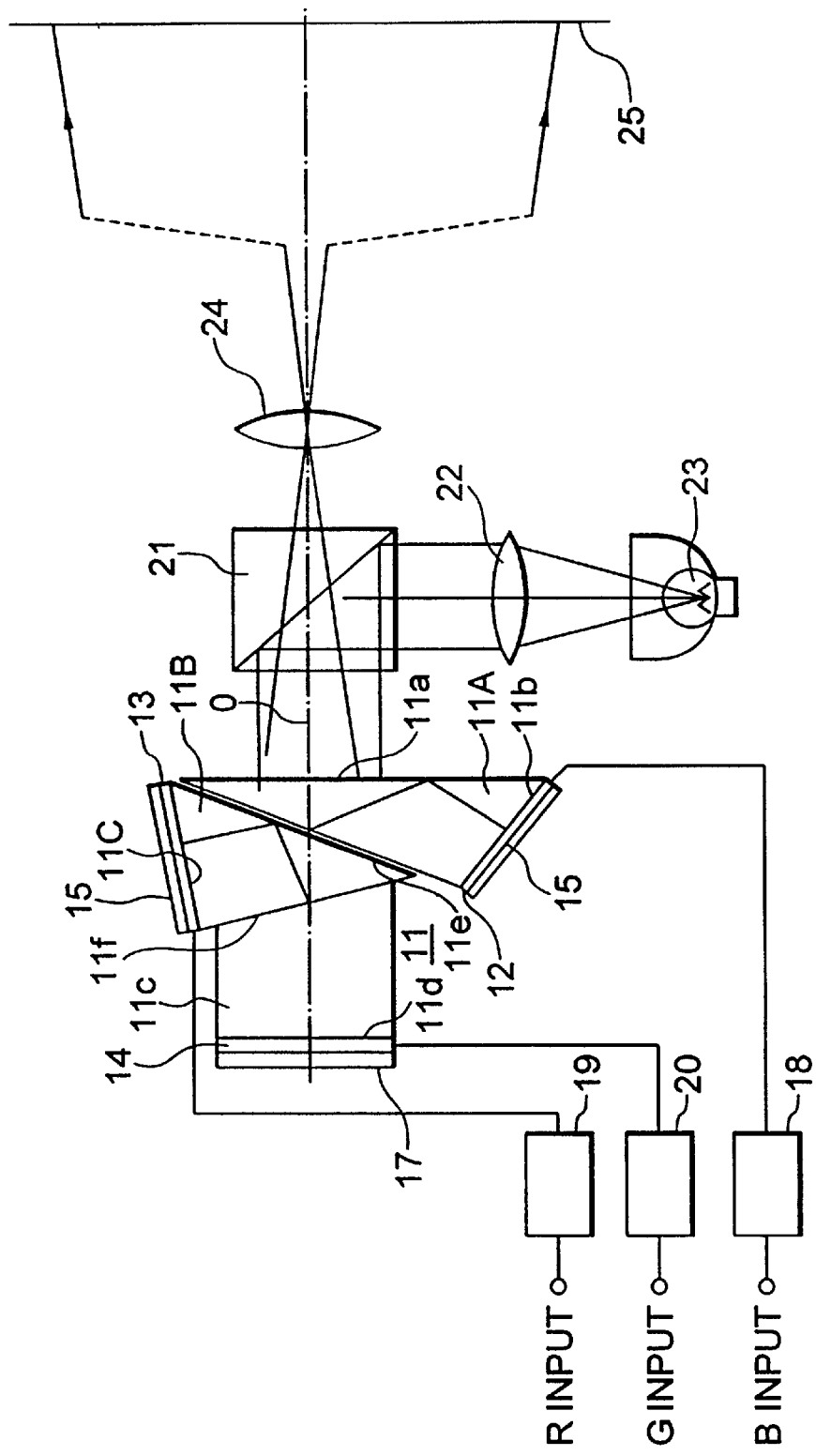
FIG. 18 is a view illustrating a construction of a projection type display device in the prior art.

The polarization beam splitter 502 in the fifth embodiment will be explained with reference to FIG. 17. The polarization beam splitter 502 is constructed of a prism member 502A and a prism member 502B which are bonded to each other with a polarization separator being interposed therebetween. The prism member 502A is classified as a right-angled isosceles triangle pole prism, while the prism member 502B is categorized as a triangle prism pole of which apex angles are 45 degrees, (90+θ) degrees, and (45−θ) degrees. The prism member 502B actually takes a quadrangle shape of which a portion having the apex angle of (45−θ) degrees (which is indicated by the broken line in FIG. 17) is cut away, but takes substantially the triangle shape. Hence, the prism member 502B is explained as a triangle prism.

The ghost image that should be prevented from being projected in the fifth embodiment will be described. Among the light source beams entering the polarization beam splitter 502 from the surface 502A*a*, the beams of P-polarized light penetrating through the polarization separator 502*p* exit from the surface 502B*a* and are cast away. Some of the beams of P-polarized light penetrating through the polarization separator 502*p* are reflected by the anti-reflection film formed on the surface 502B*a*, and exit at an outgoing angle ψ from the surface 502B*b*.

The ghost image caused by those beams of light can be, as explained in the third embodiment, prevented from appearing by cutting the unnecessary light beams with the aperture stop of the projection lens 107 having the proper numerical aperture (NA). In the fifth embodiment, it is impossible to prevent the occurrence of the ghost image caused by the light beams, reflected from the surface 502A*b* of the polarization beam splitter 502, of the beams of S-polarized light reflected by the polarization separator 502*p*.

As obvious from the discussion given above, the projection type display device according to the present invention is capable of setting, of the modulated beams of light entering the projection lens, the light paths of the unintended beams of light reflected from the outgoing surface of the polarization beam splitter and from the incident surface of the color separating/synthesizing optical system because of the configuration in which the normal line of the outgoing surface of the polarization beam splitter has the predetermined angle larger than the zero degree with respect to the optical axis of the light source beams, and the incident surface of the color separating/synthesizing optical system is disposed in parallel to the outgoing surface of the polarization beam splitter, whereby a preferable projection image can be projected with the prevention of formation of the ghost image.

What is claimed is:

1. A projection type display device comprising:
   a color separating/synthesizing optical system comprising prisms for making color separations of a light source beam via a polarization beam splitter comprising prisms;
   light valves, disposed respectively for color light beams color-separated by the color separating/synthesizing optical system, upon which the respective color-separated light beams are incident, the light beams exiting from said light valves being synthesized by said color separating/synthesizing optical system, and the synthesized light beam exiting;
   said polarization beam splitter analyzing the synthesized light beam and taking out the analyzed light beam; and
   a projection lens for projecting the analyzed light beam on a screen,
   wherein a normal line to an outgoing surface of one of said prisms of said polarization beam splitter with respect to the light source beam exiting toward said color separating/synthesizing optical system from said polarization beam splitter has a predetermined angle larger than zero degree with respect to an optical axis of the light source beam, and
   an incident surface of said color separating/synthesizing optical system, with respect to the light source beam exiting toward said color separating/synthesizing optical system from said polarization beam splitter, is disposed in parallel to the outgoing surface of said polarization beam splitter.

2. A projection type display device according to claim 1, wherein said polarization beam splitter includes a plurality of optical prism members, and the following formula is satisfied:

$$\sin(2\theta) > 2 \cdot NA/n \cdot (1-NA^2)^{1/2}$$

where θ is the predetermined angle made by the normal line of the outgoing surface of said polarization beam splitter and by the optical axis of the light source beam, n is the refractive index of each of said optical prism members constituting said polarization beam splitter, and NA is the numerical aperture with respect to said projection lens on the side of said light valve.

3. A projection type display device according to claim 1, wherein the optical axis of the light source beam entering said polarization beam splitter has an incident angle of 45 degrees to a polarization separator of said polarization beam splitter,
   said polarization beam splitter comprising two triangular prisms, a first triangular prism of said two triangular prisms having three apex angles, one of which is 45 degrees, another one of which is an obtuse angle, and the remaining one of which is an acute angle, and a second triangular prism of said two triangular prisms having three apex angles, one of which is 45 degrees;
   wherein a surface interposed between the apex angle of 45 degrees and the acute angle of said first triangular prism and a surface including the apex angle of 45 degrees of said second triangular prisms are bonded in such a manner that the apex angles of 45 degrees are matched with each other, and a polarization separation film being interposed therebetween.

4. A projection type display device according to claim 1, wherein the optical axis of the light source beam entering said polarization beam splitter has an incident angle α other than 45 degrees to a polarization separator of said polarization beam splitter,
   said polarization beam splitter comprising two triangular prisms, a first triangular prism of said two triangular prisms having three apex angles, one of which is α degrees, another one of which is (α+θ) degrees if the predetermined angle is set to θ, and a second triangular prism of said two triangular prisms having three apex angles, one of which is α degrees;
   wherein a surface interposed between the apex angle α and the apex angle (α+θ) of said first triangular prism and a surface including the apex angle α of said second triangular prism are bonded in such a manner that the apex angles α are matched with each other, and a polarization separation film being interposed therebetween.

5. A projection type display device comprising:
   a color separating/synthesizing optical system comprising prisms for making color separations of a light source beam via a polarization beam splitter;
   light valves, disposed respectively for color light beams color-separated by the color separating/synthesizing optical system, upon which the respective color-separated light beams are incident, the light beams exiting from said light valves being synthesized by said color separating/synthesizing optical system, and a synthesized light beam exiting from said color separating/synthesizing optical system;

said polarization beam splitter analyzing the synthesized light beam and taking out the analyzed light beam; and a projection lens for projecting said analyzed light beam on a screen, wherein a light beam in the light source beam, exiting from said polarization beam splitter, then being reflected directly from an incident surface of said color separating/synthesizing optical system and entering said projection lens through said polarization beam splitter, does not pass through an aperture defined by an aperture stop determining the numerical aperture NA with respect to said projection lens on the side of said light valves.

6. A projection type display device comprising:

a color separating/synthesizing optical system for making color separations of a light source beam via a polarization beam splitter comprising prisms;

light valves, disposed respectively for color light beams color-separated by the color separating/synthesizing optical system, upon which the respective color-separated light beams are incident, the light beams exiting from said light valves being synthesized by said color separating/synthesizing optical system, and a synthesized light beam exiting from said color separating/synthesizing optical system;

said polarization beam splitter analyzing the synthesized light beam and taking out the analyzed light beam; and a projection lens for projecting said analyzed light beam on a screen, wherein a light beam in the light source beam, separated in polarization through a polarization separator of said polarization beam splitter, then reflected by an outgoing surface of said polarization beam splitter, reflected by said polarization separator of said polarization beam splitter and entering said projection lens, does not pass through an aperture defined by an aperture stop determining the numerical aperture NA with respect to said projection lens on the side of said light valves.

7. A projection type display device comprising:

a color separating/synthesizing optical system for making color separations of a light source beam via a polarization beam splitter comprising prisms;

light valves, disposed respectively for color light beams color-separated by the color separating/synthesizing optical system, upon which the respective color-separated light beams are incident, the light beams exiting from said light valves being synthesized by said color separating/synthesizing optical system, and a synthesized light beam exiting from said color separating/synthesizing optical system;

said polarization beam splitter analyzing the synthesized light beam and taking out the analyzed light beam; and a projection lens for projecting said analyzed light beam on a screen, wherein a normal line to an outgoing surface of one of said prisms of said polarization beam splitter, with respect to the light source beam exiting toward said color separating/synthesizing optical system from said polarization beam splitter, has a predetermined angle larger than zero degree with respect to an optical axis of the light source beam.

8. A projection type display device comprising:

a plurality of light valves disposed for a plurality of color light beams, respectively;

a projection lens having an aperture stop determining a numerical aperture NA on the side of said light valves;

a polarization beam splitter disposed between said light valves and said projection lens;

a color separation/synthesizing optical system disposed between said light valves and said beam splitter;

a light source; and a light beam from said light source being guided to said color separating/synthesizing optical system through said polarization beam splitter and color-separated into a plurality of color-separated color light beams by said color separating/synthesizing optical system;

said plurality of color-separated color light beams being made incident onto said light valves, respectively;

the color light beams exiting from said respective light valves being synthesized through said color separating/synthesizing optical system so that the synthesized light beam exits from said color separating/synthesizing optical system;

said synthesized light beam being analyzed through said polarization beam splitter; and the analyzed light beam being projected on a screen through said projection lens; and wherein arrangement is so made that a light beam in the light source beam, exiting from said polarization beam splitter, then being reflected directly from an incident surface of said color separating/synthesizing optical system and entering said projection lens through said polarization beam splitter, does not pass through an aperture defined by said aperture stop of said projection lens.

9. A projection type display device comprising:

a plurality of light valves disposed for a plurality of color light beams, respectively;

a projection lens having an aperture stop determining a numerical aperture NA on the side of said light valves;

a polarization beam splitter disposed between said light valves and said projection lens;

a color separation/synthesizing optical system disposed between said light valves and said beam splitter;

a light source; and a light beam from said light source being guided to said color separating/synthesizing optical system through said polarization beam splitter and color-separated into a plurality of color-separated color light beams by said color separating/synthesizing optical system;

said plurality of color-separated color light beams being made incident onto said light valves, respectively;

the color light beams exiting from said respective light valves being synthesized through said color separating/synthesizing optical system so that the synthesized light beam exits from said color separating/synthesizing optical system;

said synthesized light beam being analyzed through said polarization beam splitter; and the analyzed light beam being projected on a screen through said projection lens; and wherein arrangement is so made that a light beam in the light source beam, separated in polarization through a polarization separator of said polarization beam splitter, then reflected by an outgoing surface of said polarization beam splitter, reflected by said polarization separator of said polarization beam splitter and entering said projection lens, does not pass through an aperture defined by said aperture stop of said projection lens.

10. A projection type display device comprising:

a color separating/synthesizing optical system for making color separations of a light source beam via a polarization beam splitter comprising prisms;

light valves, disposed respectively for color light beams color-separated by the color separating/synthesizing optical system, upon which the respective color-separated light beams are incident, the light beams exiting from said light valves being synthesized by said color separating/synthesizing optical system, and a synthesized light beam exiting from said color separating/synthesizing optical system;

said polarization beam splitter analyzing the synthesized light beam and taking out the analyzed light beam; and a projection lens for projecting said analyzed light beam on a screen, wherein a light beam in the light source beam, being reflected by an outgoing surface of one of said prisms of said polarization beam splitter, exiting from said polarization beam splitter through a polarization separator thereof and entering said projection lens, does not pass through an aperture defined by an aperture stop determining the numerical aperture NA with respect to said projection lens on the side of said light valves.

11. A projection type display device according to claim 10, wherein a light beam in the light source beam, exiting from said polarization beam splitter, then being reflected directly from an incident surface of said color separating/synthesizing optical system and entering said projection lens through said polarization beam splitter, does not pass through said aperture defined by said aperture stop determining the numerical aperture NA with respect to said projection lens on the side of said light valves.

12. A projection type display device comprising:

a plurality of light valves disposed for a plurality of color light beams, respectively;

a projection lens having an aperture stop determining a numerical aperture NA on the side of said light valves;

a polarization beam splitter disposed between said light valves and said projection lens;

a color separation/synthesizing optical system disposed between said light valves and said beam splitter;

a light source; and a light beam from said light source being guided to said color separating/synthesizing optical system through said polarization beam splitter and color-separated into a plurality of color-separated color light beams by said color separating/synthesizing optical system;

said plurality of color-separated color light beams being made incident onto said light valves, respectively;

the color light beams exiting from said respective light valves being synthesized through said color separating/synthesizing optical system so that the synthesized light beam exits from said color separating/synthesizing optical system;

said synthesized light beam being analyzed through said polarization beam splitter; and the analyzed light beam being projected on a screen through said projection lens; and wherein arrangement is so made that a light beam in the light source beam, being reflected by an outgoing surface of said polarization beam splitter, exiting from said polarization beam splitter through a polarization separator thereof and entering said projection lens, does not pass through an aperture defined by said aperture stop of said projection lens.

13. A projection type display device according to claim 12, wherein arrangement is so made that a light beam in the light source beam, exiting from said polarization beam splitter, then being reflected directly from said incident surface of said color separating/synthesizing optical system and entering said projection lens through said polarization beam splitter, does not pass through an aperture defined by said aperture stop of said projection lens.

* * * * *